(12) United States Patent
Nakano et al.

(10) Patent No.: US 10,792,704 B2
(45) Date of Patent: Oct. 6, 2020

(54) ELECTROSTATIC TRANSDUCER AND METHOD FOR MANUFACTURING SAME

(71) Applicant: Sumitomo Riko Company Limited, Aichi (JP)

(72) Inventors: Katsuhiko Nakano, Aichi (JP); Masaki Nasu, Aichi (JP); Takanori Murase, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 49 days.

(21) Appl. No.: 16/281,123

(22) Filed: Feb. 21, 2019

(65) Prior Publication Data

US 2019/0176192 A1 Jun. 13, 2019

Related U.S. Application Data

(63) Continuation of application No. PCT/JP2017/041614, filed on Nov. 20, 2017.

(30) Foreign Application Priority Data

Nov. 25, 2016 (JP) ................................ 2016-228720
Jun. 28, 2017 (JP) ................................ 2017-125881

(51) Int. Cl.
*H04R 19/04* (2006.01)
*H04R 19/02* (2006.01)
(Continued)

(52) U.S. Cl.
CPC ........ *B06B 1/0292* (2013.01); *B32B 38/0004* (2013.01); *B32B 38/0012* (2013.01);
(Continued)

(58) Field of Classification Search
CPC ............................. H02K 3/38; H02K 15/0062
(Continued)

(56) References Cited

U.S. PATENT DOCUMENTS 3,859,477 A * 1/1975 Skvor .................... H04R 19/02
381/163
8,553,911 B2 * 10/2013 Chen .................... B81B 3/0078
257/416

(Continued)

FOREIGN PATENT DOCUMENTS

JP         S6310594       3/1988
JP         2005312230     11/2005
(Continued)

OTHER PUBLICATIONS

"International Search Report (Form PCT/ISA/210) of PCT/JP2017/041614," dated Jan. 30, 2018, with English translation thereof, pp. 1-3.

(Continued)

*Primary Examiner* — Jose A Gonzalez Quinones
(74) *Attorney, Agent, or Firm* — JCIPRNET

(57) ABSTRACT

Provided is an electrostatic transducer (1) in which an electrostatic unit (10) is formed so as to be flat and wound into a roll, from a first laminate sheet (110) and a second laminate sheet (120). The first laminate sheet (110) is provided with a first electrode sheet (111) and two first dielectric sheets (112, 113) laminated onto both surfaces of the first electrode sheet (111). The second laminate sheet (120) is provided with a second electrode sheet (121) and two second dielectric sheets (122, 123) laminated onto both surfaces of the second electrode sheet (121).

25 Claims, 8 Drawing Sheets

(51) Int. Cl.
  *H02K 3/38* (2006.01)
  *B06B 1/02* (2006.01)
  *B32B 38/00* (2006.01)
  *G08B 6/00* (2006.01)
  *G10K 11/175* (2006.01)

(52) U.S. Cl.
  CPC ... *B32B 2307/202* (2013.01); *B32B 2307/204* (2013.01); *B32B 2457/00* (2013.01); *G08B 6/00* (2013.01); *G10K 11/175* (2013.01); *H04R 19/02* (2013.01); *H04R 19/04* (2013.01)

(58) Field of Classification Search
  USPC .............. 310/309, 310, 211, 363–365, 367
  See application file for complete search history.

(56) References Cited

U.S. PATENT DOCUMENTS

| | | | | |
|---|---|---|---|---|
| 8,945,743 | B2* | 2/2015 | Kwon | H01M 10/0463 429/94 |
| 2001/0005561 | A1* | 6/2001 | Yamada | H01M 10/0431 429/152 |
| 2010/0104930 | A1* | 4/2010 | Kim | H01M 10/0431 429/94 |
| 2012/0060355 | A1 | 3/2012 | Tsuchikawa et al. | |
| 2012/0308862 | A1* | 12/2012 | Shibata | H01M 4/13 429/94 |
| 2017/0285751 | A1 | 10/2017 | Nakano et al. | |

FOREIGN PATENT DOCUMENTS

| | | |
|---|---|---|
| JP | 2012065426 | 3/2012 |
| JP | 2013182374 | 9/2013 |

OTHER PUBLICATIONS

"International Preliminary Report on Patentability; this report contains the following items: Form PCT/IB/373, PCT/ISA237(cover sheet), PCT/ISA237(Box No. I), PCT/ISA237(Box No. V)", dated Jan. 30, 2018, which is English translation of "Written Opinion of the International Searching Authority", pp. 1-11.

\* cited by examiner

ELECTROSTATIC TRANSDUCER AND METHOD FOR MANUFACTURING SAME

CROSS-REFERENCE TO RELATED APPLICATIONS

This application is a continuation application of International Application number PCT/JP2017/041614, filed on Nov. 20, 2017, which claims the priority benefit of Japan Patent Application No. 2016-228720, filed on Nov. 25, 2016, and Japan Patent Application No. 2017-125881, filed on Jun. 28, 2017. The entirety of each of the above-mentioned patent applications is hereby incorporated by reference herein and made a part of this specification.

BACKGROUND

Technical Field

The disclosure relates to an electrostatic transducer and a method for manufacturing the same.

Description of Related Art

In an electrostatic transducer, the electrostatic capacitance increases as the number of layers of electrodes and dielectrics laminated therein increases. Therefore, it is desired that the structure of the electrostatic transducer can be easily formed with a large number of laminated layers.

Regarding devices that are of types different from the electrostatic transducer, devices as described in Japanese Laid-open No. 2013-182374, Japanese Laid-open No. 2005-312230, Japanese Laid-open No. 2012-65426, and Japanese Laid-open No. S63-10594 have been disclosed. Japanese Laid-open No. 2013-182374 describes a sensation presentation device using an electrostrictive material. The device is manufactured as follows (see FIG. 4 of Japanese Laid-open No. 2013-182374). A first sheet and a second sheet are prepared, wherein the first sheet has a first electrode formed on one surface of an electrostrictive material layer, and the second sheet has a second electrode formed on one surface of an electrostrictive material layer. The two sheets are stacked in a manner that the first electrode and the second electrode are alternately arranged via the electrostrictive material layer. The stacked two sheets are wound around a core, and flattened after the core is pulled out.

Japanese Laid-open No. 2005-312230 describes a device using a piezoelectric element. The device is manufactured by disposing electrodes on two surfaces of a sheet substrate having piezoelectricity, and winding the sheet substrate into a roll shape to form a roll body. Then, connection electrodes are respectively disposed on two end surfaces in the axial direction of the roll body.

Japanese Laid-open No. 2012-65426 describes a dielectric actuator. The actuator is manufactured by alternately laminating dielectric elastomer layers and conductive rubber layers in the thickness direction alternately, laminating the conductive rubber layers by sequentially shifting them with respect to the dielectric elastomer layers in the width direction, and winding the laminated sheet body in a spiral shape around a core material.

Japanese Laid-open No. S63-10594 describes a device using a piezoelectric element. In the device, a large number of piezoelectric elements that have electrode thin films formed on the upper and lower surfaces are laminated with their upper and lower surfaces reversed alternately, and side surface electrodes are formed to commonly connect the respective electrode thin films. This manufacturing method is referred to as sheet lamination method.

For the electrostatic transducer, the roll shape winding method as described in Japanese Laid-open No. 2013-182374, Japanese Laid-open No. 2005-312230, and Japanese Laid-open No. 2012-65426 can increase the number of laminated layers more efficiently than the sheet lamination method as described in Japanese Laid-open No. S63-10594.

However, as described in Japanese Laid-open No. 2013-182374, Japanese Laid-open No. 2005-312230, and Japanese Laid-open No. 2012-65426, when the electrode is exposed over the entire surface before being formed into a roll shape, it needs to be handled with care. For example, the exposed electrode may have defects such as scratches.

SUMMARY

The disclosure provides an electrostatic transducer and a manufacturing method of the same, which increase the number of laminated layers by applying the roll shape winding method and are easy to handle.

An electrostatic transducer according to the disclosure includes an electrostatic unit. The electrostatic unit includes a first laminate sheet and a second laminate sheet. The first laminate sheet includes a first electrode sheet formed in a band shape, and two first dielectric sheets formed in a band shape and having a width larger than a width of the first electrode sheet. The two first dielectric sheets are laminated on two surfaces of the first electrode sheet with first ends in a width direction aligned with a first end in a width direction of the first electrode sheet. The second laminate sheet includes a second electrode sheet formed in a band shape, and two second dielectric sheets formed in a band shape and having a width larger than a width of the second electrode sheet. The two second dielectric sheets are laminated on two surfaces of the second electrode sheet with first ends in a width direction aligned with a first end in a width direction of the second electrode sheet.

The electrostatic unit is in a state of being wound into a roll shape from the first laminate sheet and the second laminate sheet, and is flattened into a flat shape. The first laminate sheet is in a state of being wound into a roll shape and is flattened into a flat shape. The second laminate sheet is in a state of being laminated on the first laminate sheet and wound into a roll shape together with the first laminate sheet, and is flattened into a flat shape.

The first electrode sheet and the second electrode sheet are offset in the width direction. The first electrode sheet is exposed on a first end surface in an axial direction of the roll shape and the second electrode sheet is exposed on a second end surface in the axial direction of the roll shape.

According to the electrostatic transducer of the disclosure, the electrostatic unit is in a state of being wound into a roll shape from the first laminate sheet and the second laminate sheet, and is flattened into a flat shape. Accordingly, a large number of electrodes and a large number of dielectrics can be laminated easily. Further, the first laminate sheet constituting the electrostatic unit sandwiches the first electrode sheet with the two first dielectric sheets. Therefore, in the first laminate sheet, the planar portion of the first electrode sheet is covered by the two first dielectric sheets. That is, in the first laminate sheet, the entire surface of the planar portion of the first electrode sheet is not exposed. The same applies to the second laminate sheet. Therefore, the first laminate sheet and the second laminate sheet are easy to handle, and it is possible to suppress occurrence of defects on the first electrode sheet and the second electrode sheet.

A manufacturing method of an electrostatic transducer according to the disclosure includes: a first laminate sheet manufacturing process of manufacturing a first laminate sheet, which includes a first electrode sheet formed in a band shape, and two first dielectric sheets formed in a band shape and having a width larger than a width of the first electrode sheet, wherein the two first dielectric sheets are laminated on two surfaces of the first electrode sheet with first ends in a width direction aligned with a first end in a width direction of the first electrode sheet; a second laminate sheet manufacturing process of manufacturing a second laminate sheet, which includes a second electrode sheet formed in a band shape, and two second dielectric sheets formed in a band shape and having a width larger than a width of the second electrode sheet, wherein the two second dielectric sheets are laminated on two surfaces of the second electrode sheet with first ends in a width direction aligned with a first end in a width direction of the second electrode sheet; a composite laminate sheet manufacturing process of manufacturing a composite laminate sheet formed by laminating the first laminate sheet and the second laminate sheet; and a flattening rolling process of manufacturing a flat roll body by winding the composite laminate sheet into a roll shape and flattening the composite laminate sheet into a flat shape.

In the composite laminate sheet, the first electrode sheet and the second electrode sheet are offset in the width direction. In the composite laminate sheet, the first electrode sheet is exposed on a first end surface in an axial direction of the roll shape, and in the composite laminate sheet, the second electrode sheet is exposed on a second end surface in the axial direction of the roll shape.

According to the manufacturing method of the disclosure, the first laminate sheet manufactured by the first laminate sheet manufacturing process is configured to sandwich the first electrode sheet with the two first dielectric sheets. Therefore, in the first laminate sheet, the planar portion of the first electrode sheet is covered by the two first dielectric sheets. That is, in the first laminate sheet, the entire surface of the planar portion of the first electrode sheet is not exposed. The same applies to the second laminate sheet. Therefore, the first laminate sheet and the second laminate sheet are easy to handle, and it is possible to suppress occurrence of defects on the first electrode sheet and the second electrode sheet. Then, in the flattening rolling process, the composite laminate sheet formed by laminating the first laminate sheet and the second laminate sheet is wound into a roll shape and flattened into a flat shape. Therefore, a large number of electrodes and a large number of dielectrics can be laminated easily.

DESCRIPTION OF THE EMBODIMENTS

1. First Embodiment (1-1. Outline of the Electrostatic Transducer 1)

An electrostatic transducer 1 utilizes a change in electrostatic capacitance and is an actuator that generates vibration, sound, etc. or a sensor that detects vibration, sound, etc. The electrostatic transducer 1, which serves as an actuator, generates vibration or sound by applying a voltage to an electrode. The electrostatic transducer 1, which serves as a sensor, generates a voltage at an electrode when the sensor vibrates due to input of vibration or sound.

The electrostatic transducer 1, which serves as a vibration actuator, is, for example, a device for presenting tactile vibration to a human being, a device for generating vibration in an opposite phase to a structure for damping the structure, or the like. The electrostatic transducer 1, which serves as an actuator for generating sound, is a speaker for generating sound waves to be sensed by hearing of a human being, a sound masking device for cancelling noise, or the like.

The vibration generated by the vibration actuator is vibration at a relatively low frequency, and the sound generated by the actuator for generating sound is vibration at a relatively high frequency. Since the electrostatic transducer 1, which serves as an actuator, in the present embodiment utilizes vibration of a spring mass system, it is suitable for a low frequency vibrator and a low frequency sound generator.

In the present embodiment, the electrostatic transducer 1 is, for example, a vibration actuator for presenting tactile vibration to a human being. For example, the electrostatic transducer 1 is applied to an actuator that is mounted on a portable terminal for vibrating the portable terminal. The electrostatic transducer 1, which serves as a sensor, has substantially the same configuration.

(1-2. Configuration of the Electrostatic Transducer 1)

Figure 1:
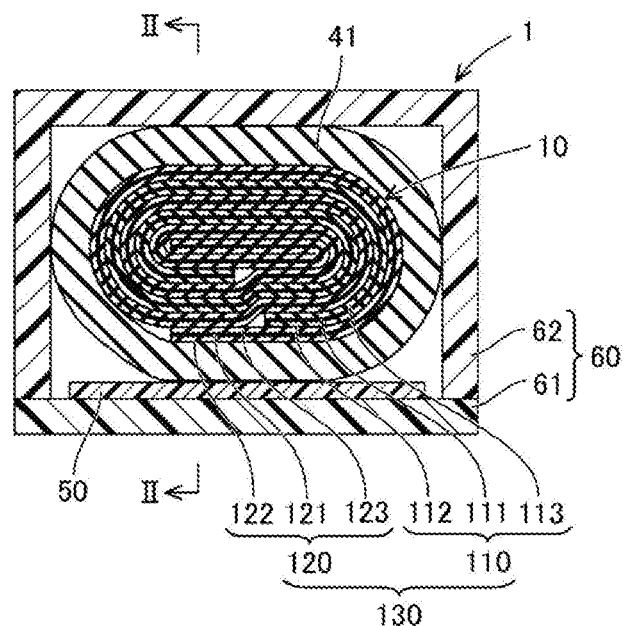
FIG. 1 is a cross-sectional view of the electrostatic transducer 1, taken along the line I-I of FIG. 2.
Figure 2:
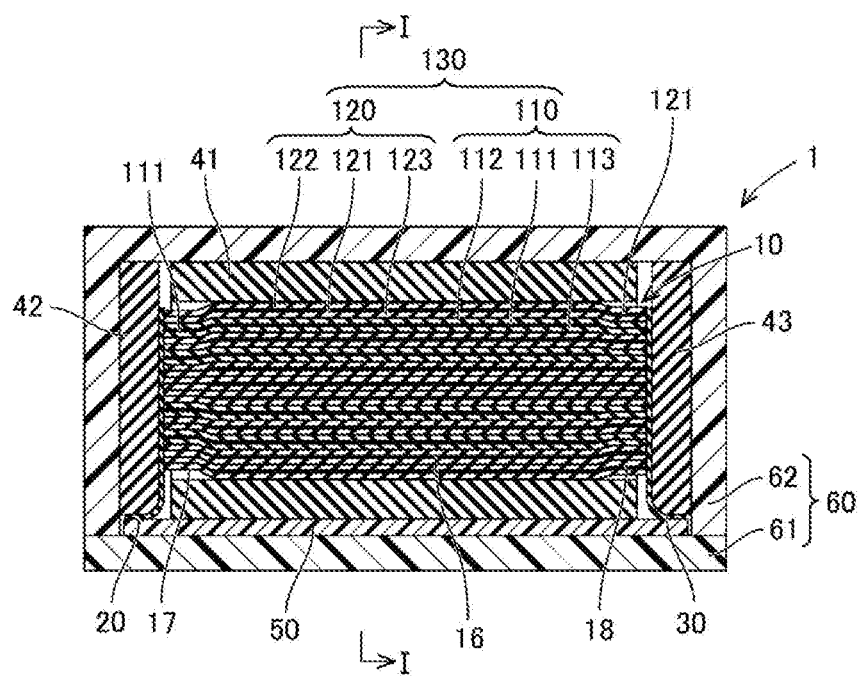
FIG. 2 is a cross-sectional view taken along the line II-II of FIG. 1.
Figure 3:
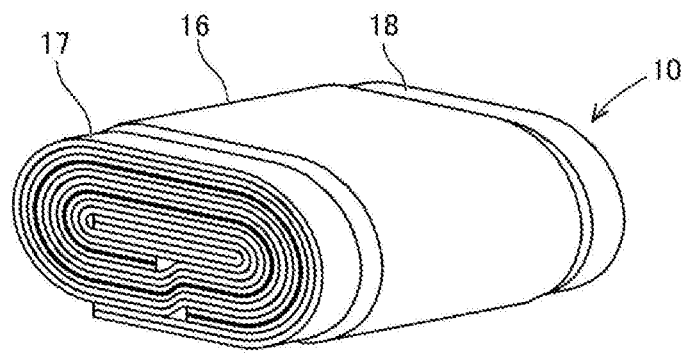
FIG. 3 is a perspective view of the electrostatic unit 10 constituting the electrostatic transducer 1.

A configuration of the electrostatic transducer 1 will be described with reference to FIG. 1 to FIG. 3. Here, in FIG. 1 to FIG. 3, the thickness of each member is exaggerated for the sake of clarity. Therefore, in practice, the thickness of the electrostatic transducer 1 in the vertical direction of FIG. 1 is formed to be very small. As shown in FIG. 1 to FIG. 3, the electrostatic transducer 1 includes an electrostatic unit 10, a first conductive part 20, a second conductive part 30, a first elastic body 41, a second elastic body 42, a third elastic body 43, a control substrate 50, and a cover 60.

As shown in FIG. 1 to FIG. 3, the electrostatic unit 10 is formed of an elastomer and is formed in a flat shape. The electrostatic unit 10 includes a plurality of electrode sheets 111 and 121 and a plurality of dielectric sheets 112, 113, 122, and 123 that are laminated in a direction orthogonal to the flat surface. Specifically, as shown in FIG. 1 and FIG. 3, the electrostatic unit 10 is in a state of being wound into a roll shape from a composite laminate sheet 130 and is flattened into a flat shape. Since the electrostatic unit 10 is formed in a roll shape and a flat shape, when viewed from the axial direction of the roll shape, the electrostatic unit 10 has two plane surfaces that face away from each other, and curved convex side surfaces connecting the two plane surfaces. Furthermore, the electrostatic unit 10 has plane end surfaces on two sides in the axial direction of the roll shape.

Here, the composite laminate sheet 130 is formed by laminating one first laminate sheet 110 and one second laminate sheet 120. The first laminate sheet 110 is formed by laminating one first electrode sheet 111 and two first dielectric sheets 112 and 113 so that the one first electrode sheet 111 is sandwiched between the two first dielectric sheets 112 and 113 in the thickness direction. The second laminate sheet 120 is formed by laminating one second electrode sheet 121 and two second dielectric sheets 122 and 123 so that the one second electrode sheet 121 is sandwiched between the two second dielectric sheets 122 and 123 in the thickness direction. That is, the electrostatic unit 10 is formed by laminating a plurality of first electrode sheets 111, a plurality of second electrode sheets 121, and a plurality of dielectric sheets 112, 113, 122, and 123 in the direction orthogonal to the flat surface.

The first electrode sheet 111 and the second electrode sheet 121 are formed of an elastic deformable material such as an elastomer in a sheet shape. The first electrode sheet 111 and the second electrode sheet 121 are formed of the same material.

The first electrode sheet 111 and the second electrode sheet 121 are formed by blending conductive fillers into the elastomer. Therefore, the first electrode sheet 111 and the second electrode sheet 121 have flexibility and stretchability. The elastomer constituting the first electrode sheet 111 and the second electrode sheet 121 may be silicone rubber, ethylene-propylene copolymer rubber, natural rubber, styrene-butadiene copolymer rubber, acrylonitrile-butadiene copolymer rubber, acrylic rubber, epichlorohydrin rubber, chlorosulfonated polyethylene, chlorinated polyethylene, urethane rubber, or the like, for example. In addition, the conductive fillers blended into the first electrode sheet 111 and the second electrode sheet 121 are particles having conductivity. For example, fine particles of a carbon material, metal, or the like may be used.

Here, the first electrode sheet 111 and the second electrode sheet 121 are formed in a sheet shape by printing an electrode material on the surface of a sheet-shaped substrate (not shown). In this case, the substrate is formed so as not to hinder the deformation of the first electrode sheet 111 and the second electrode sheet 121. For example, a flexible resin material or the like which is formed thinner than the electrode material is used for the substrate. In addition, the first electrode sheet 111 and the second electrode sheet 121 may be formed of only the electrode material in a sheet shape that can be present as a single body, or may be formed in a sheet shape by directly printing the electrode material on the surfaces of the dielectric sheets 112, 113, 122, and 123.

The first dielectric sheets 112 and 113 and the second dielectric sheets 122 and 123 are formed of an elastic deformable material such as an elastomer in a sheet shape. The first dielectric sheets 112 and 113 and the second dielectric sheets 122 and 123 are formed thicker than the first electrode sheet 111 and the second electrode sheet 121.

The first dielectric sheets 112 and 113 and the second dielectric sheets 122 and 123 are formed of an elastomer. Accordingly, the first dielectric sheets 112 and 113 and the second dielectric sheets 122 and 123 have flexibility and stretchability. Particularly, the first dielectric sheets 112 and 113 and the second dielectric sheets 122 and 123 stretch in the thickness direction and is stretchable in the flat surface direction along with their stretch in the thickness direction. A material that functions as a dielectric of an electrostatic body is used as the first dielectric sheets 112 and 113 and the second dielectric sheets 122 and 123. The elastomer constituting the first dielectric sheets 112 and 113 and the second dielectric sheets 122 and 123 may be silicone rubber, acrylonitrile-butadiene copolymer rubber, acrylic rubber, epichlorohydrin rubber, chlorosulfonated polyethylene, chlorinated polyethylene, urethane rubber, or the like, for example.

Here, like the first electrode sheet 111, the first dielectric sheets 112 and 113 may be formed in a sheet shape by printing a dielectric material on the surface of a sheet-shaped substrate (not shown), or may be formed of only the dielectric material in a sheet shape that can be present as a single body. The same applies to the second dielectric sheets 122 and 123.

Here, as shown in FIG. 2 and FIG. 3, the electrostatic unit 10 is divided into a central laminate part 16, a first end laminate part 17, and a second end laminate part 18 in the axial direction of the roll shape. The central laminate part 16, the first end laminate part 17, and the second end laminate part 18 have different lamination targets.

The central laminate part 16 is positioned at the center in the axial direction of the roll shape of the electrostatic unit 10. The central laminate part 16 is formed by laminating the first electrode sheet 111, the second electrode sheet 121, the first dielectric sheets 112 and 113, and the second dielectric sheets 122 and 123. That is, the central laminate part 16 functions as an electrostatic body. Specifically, the central laminate part 16 mainly includes the first dielectric sheet 112, the first electrode sheet 111, the first dielectric sheet 113, the second dielectric sheet 122, the second electrode sheet 121, and the second dielectric sheet 123 that are repeatedly laminated in this order.

The first end laminate part 17 is positioned on the first end side with respect to the central laminate part 16 in the axial direction of the roll shape of the electrostatic unit 10, that is, on the left side of FIG. 2 and FIG. 3. The first end laminate part 17 is formed by laminating the first electrode sheet 111, the first dielectric sheets 112 and 113, and the second dielectric sheets 122 and 123. That is, the first end laminate part 17 functions as a terminal of the first electrode sheet 111. Specifically, the first end laminate part 17 mainly includes the first dielectric sheet 112, the first electrode sheet 111, the first dielectric sheet 113, the second dielectric sheet 122, and the second dielectric sheet 123 that are repeatedly laminated in this order. In other words, the first end laminate part 17 does not have the second electrode sheet 121.

The second end laminate part 18 is positioned on the second end side with respect to the central laminate part 16 in the axial direction of the roll shape of the electrostatic unit 10, that is, on the right side of FIG. 2 and FIG. 3. The second end laminate part 18 is formed by laminating the second electrode sheet 121, the first dielectric sheets 112 and 113, and the second dielectric sheets 122 and 123. That is, the second end laminate part 18 functions as a terminal of the second electrode sheet 121. The second end laminate part 18 mainly includes the first dielectric sheet 112, the first dielectric sheet 113, the second dielectric sheet 122, the second electrode sheet 121, and the second dielectric sheet 123 that are repeatedly laminated in this order. In other words, the second end laminate part 18 does not have the first electrode sheet 111.

Then, an end of the first electrode sheet 111 is exposed on the first end surface in the axial direction (the axial direction of the roll shape) around which the composite laminate sheet 130 of the electrostatic unit 10 is wound, that is, the end surface of the first end laminate part 17. The first end surface is the left end surface of the electrostatic unit 10 in FIG. 2. On the other hand, an end of the second electrode sheet 121 is exposed on the second end surface of the electrostatic unit 10, that is, the end surface of the second end laminate part 18. The second end surface is the right end surface of the electrostatic unit 10 in FIG. 2.

The first conductive part 20 and the second conductive part 30 are formed of an elastic deformable material (for example, an elastomer) in a sheet shape and bent in an L shape. Like the first electrode sheet 111, the first conductive part 20 and the second conductive part 30 are formed by blending conductive fillers into the elastomer. One side of the L shape of the first conductive part 20 is in surface contact with the first end surface (the end surface of the first end laminate part 17) of the electrostatic unit 10. That is, the first conductive part 20 conducts to the end of the first electrode sheet 111 in the first end laminate part 17. The other side of the L shape of the first conductive part 20 is formed to extend away from the electrostatic unit 10.

One side of the L shape of the second conductive part 30 is in surface contact with the second end surface (the end surface of the second end laminate part 18) of the electrostatic unit 10. That is, the second conductive part 30 conducts to the end of the second electrode sheet 121 in the second end laminate part 18. The other side of the L shape of the second conductive part 30 is formed to extend away from the electrostatic unit 10.

As shown in FIG. 1 and FIG. 2, the first elastic body 41 covers the entire outer peripheral surface of the roll shape of the electrostatic unit 10. As shown in FIG. 2, the second elastic body 42 covers a surface of the first conductive part 20 on the side opposite to the electrostatic unit 10. The third elastic body 43 covers a surface of the second conductive part 30 on the side opposite to the electrostatic unit 10. Although the first elastic body 41, the second elastic body 42, and the third elastic body 43 are separate members, they may be formed integrally.

For the first elastic body 41, the second elastic body 42, and the third elastic body 43, materials having small elastic moduli $E_{(41)}$, $E_{(42)}$, and $E_{(43)}$ and small loss factors $\tan \delta_{(41)}$, $\tan \delta_{(42)}$, and $\tan \delta_{(43)}$ are used. In other words, materials that are soft and have low attenuation properties are suitable for the first elastic body 41, the second elastic body 42, and the third elastic body 43.

Particularly, the elastic modulus $E_{(41)}$ of the first elastic body 41 is smaller than the elastic modulus $E1_{(16)}$ in the direction (the lamination direction) orthogonal to the flat surface of the central laminate part 16 of the electrostatic unit 10. Further, the elastic modulus $E_{(41)}$ of the first elastic body 41 is smaller than the elastic modulus $E2_{(16)}$ in the direction (the plane direction) parallel to the flat surface of the central laminate part 16. In addition, the elastic moduli $E_{(42)}$ and $E_{(43)}$ of the second elastic body 42 and the third elastic body 43 are smaller than the elastic modulus $E2_{(16)}$ in the plane direction of the central laminate part 16.

Specifically, the ratio of the elastic modulus $E_{(41)}$ of the first elastic body 41 to the elastic modulus $E1_{(16)}$ in the lamination direction of the central laminate part 16 is 15% or less. Further, the ratio of the elastic modulus $E_{(41)}$ of the first elastic body 41 to the elastic modulus $E2_{(16)}$ in the plane direction of the central laminate part 16 is 15% or less. The ratios of the elastic moduli $E_{(42)}$ and $E_{(43)}$ of the second elastic body 42 and the third elastic body 43 to the elastic modulus $E2_{(16)}$ in the plane direction of the central laminate part 16 are 15% or less. These ratios are preferably 10% or less.

Besides, the first elastic body 41, the second elastic body 42, and the third elastic body 43 have loss factors $\tan \delta_{(41)}$, $\tan \delta_{(42)}$, and $\tan \delta_{(43)}$ equal to or smaller than the loss factor $\tan \delta_{(16)}$ of the central laminate part 16 under a predetermined condition. The predetermined condition means an environment of use where the temperature is set to $-10°$ C. to $50°$ C. and the vibration frequency is set to 300 Hz or less.

As a material that satisfies the above, silicone rubber, for example, is suitable for the first elastic body 41, the second elastic body 42, and the third elastic body 43. Urethane rubber, for example, has better attenuation properties than silicone rubber. Therefore, urethane rubber is less suitable for the first elastic body 41, the second elastic body 42, and the third elastic body 43 than silicone rubber. However, it is also possible to use urethane rubber as the first elastic body 41, the second elastic body 42, and the third elastic body 43 depending on the desired properties.

The control substrate 50 is disposed in parallel to the flat surface of the electrostatic unit 10 and disposed in contact with the surface of the first elastic body 41 on the side opposite to the central laminate part 16. Further, the control substrate 50 is in contact with the other surfaces of the L shapes of the first conductive part 20 and the second conductive part 30.

The cover 60 surrounds the electrostatic unit 10, the first conductive part 20, the second conductive part 30, the first elastic body 41, the second elastic body 42, the third elastic body 43, and the control substrate 50. Various materials such as metal and resin are suitable for the cover 60. The cover 60 includes a planar first cover 61 for fixing the control substrate 50, and a second cover 62 attached to the first cover 61.

The first cover 61 and the second cover 62 hold the central laminate part 16 and the first elastic body 41 in a state of compressing them in the direction (the lamination direction, the vertical direction in FIG. 1 and FIG. 2) orthogonal to the flat surface of the electrostatic unit 10. In this state, according to the relationship between the elastic moduli E of the members, the first elastic body 41 is compressed to a greater extent than the central laminate part 16 in the direction (the lamination direction) orthogonal to the flat surface.

Furthermore, the second cover 62 holds the central laminate part 16, the first elastic body 41, the second elastic body 42, and the third elastic body 43 in a state of compressing them in the axial direction (the left-right direction in FIG. 2) of the roll shape of the electrostatic unit 10 in the plane direction of the electrostatic unit 10. In this state, according to the relationship between the elastic moduli E of the members, the first elastic body 41, the second elastic body 42, and the third elastic body 43 are compressed to a greater extent than the central laminate part 16 in the axial direction of the roll shape of the electrostatic unit 10.

In addition, the second cover 62 holds the central laminate part 16 and the first elastic body 41 in a state of compressing them in the direction (the left-right direction in FIG. 1) orthogonal to the axial direction of the roll shape of the electrostatic unit 10 in the plane direction of the electrostatic unit 10. In this state, according to the relationship between the elastic moduli E of the members, the first elastic body 41 is compressed to a greater extent than the central laminate part 16 in the direction orthogonal to the axial direction of the roll shape in the plane direction of the electrostatic unit 10.

(1-3. Electrical Connection State of the Central Laminate Part 16)

Figure 4:
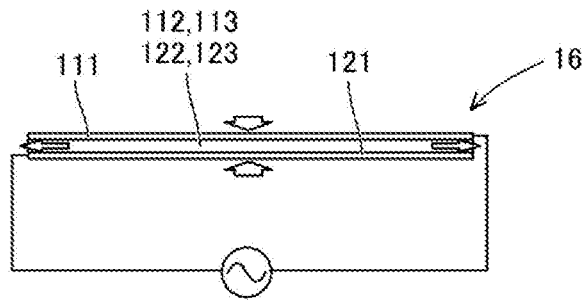
FIG. 4 is a diagram showing an electrical connection state of the central laminate part 16 constituting the electrostatic unit 10.

An electrical connection state of the central laminate part 16 will be described with reference to FIG. 4. Here, the vertical direction of FIG. 4 and the vertical direction of FIG. 1 coincide with each other. However, FIG. 4 shows one electrostatic cell that constitutes the central laminate part 16. The electrostatic cell is one first electrode sheet 111, one second electrode sheet 121, and the dielectric sheets 112, 113, 122, and 123 sandwiched between the first electrode sheet 111 and the second electrode sheet 121.

As shown in FIG. 4, the first electrode sheet 111 and the second electrode sheet 121 are disposed to face each other at a distance in the lamination direction of the central laminate part 16. A first terminal for supplying a periodic voltage to the central laminate part 16 by a driving circuit in the control substrate 50 is electrically connected to the first electrode sheet 111. A second terminal for supplying a periodic voltage to the central laminate part 16 is electrically connected to the second electrode sheet 121. In the present embodiment, the first electrode sheet 111 is connected to the output terminal of the control substrate 50, and a periodic voltage is applied. The second electrode sheet 121 is connected to the ground potential.

(1-4. Operation of the Electrostatic Transducer 1)

An operation of the electrostatic transducer 1 will be described with reference to FIG. 4. A periodic voltage is applied to the first electrode sheet 111 and the second electrode sheet 121. Here, the periodic voltage may be an alternating voltage (a periodic voltage including positive and negative) or a periodic positive electrode voltage offset to a positive value.

As the electric charge accumulated in the first electrode sheet 111 and the second electrode sheet 121 increases, the dielectric sheets 112, 113, 122, and 123 are compressed and deformed. That is, as shown in FIG. 4, the thickness of the central laminate part 16 decreases and the size (width and depth in FIG. 4) in the plane direction of the central laminate part 16 increases. Conversely, as the electric charge accumulated in the first electrode sheet 111 and the second electrode sheet 121 decreases, the dielectric sheets 112, 113, 122, and 123 return to the original thickness. That is, the thickness of the central laminate part 16 increases and the size in the plane direction of the central laminate part 16 decreases. In this way, the central laminate part 16 stretches in the lamination direction and stretches in the plane direction.

When the central laminate part 16 stretches, the electrostatic transducer 1 operates as follows. The electrostatic transducer 1 sets the state where the first elastic body 41 is compressed, as shown in FIG. 1, as the initial state. Therefore, when the thickness of the central laminate part 16 decreases due to the increase in electric charge, the first elastic body 41 is deformed so that the compression amount is smaller than that in the initial state. Conversely, when the thickness of the central laminate part 16 increases due to the decrease in electric charge, the first elastic body 41 operates so as to return to the initial state. That is, the first elastic body 41 is deformed so that the compression amount is larger than in the case where the electric charge increases.

Since the applied voltage changes periodically, the above operation is repeated. Then, the state where the center of the central laminate part 16 protrudes toward the upper side of FIG. 1 and FIG. 2 (recessed toward the lower side) and the state where the center of the central laminate part 16 protrudes toward the lower side of FIG. 1 (recessed toward the upper side) are repeated. Since the central laminate part 16 is restricted by the cover 60 via the first elastic body 41, the above operation is performed.

Along with the above deformation of the central laminate part 16, the displacement in the lamination direction (d33 direction: the same direction as the electric field) of the central laminate part 16 is transmitted to the cover 60 via the first elastic body 41. In addition, the elastic deformation force of the first elastic body 41 is changed by the stretch of the central laminate part 16. The change in the elastic deformation force of the first elastic body 41 is transmitted to the cover 60. Accordingly, as the initial state, since the first elastic body 41 is compressed, vibration in the lamination direction (d33 direction) of the central laminate part 16 can be efficiently transferred to the cover 60. That is, even though the central laminate part 16 alone generates small vibration, tactile vibration can be given to the cover 60.

Further, along with the above deformation of the central laminate part 16, the displacement in the plane direction (d31 direction: direction orthogonal to the electric field) of the central laminate part 16 is transmitted to the cover 60 via the first elastic body 41, the second elastic body 42, and the third elastic body 43. As a result, the vibration in the plane direction (d31 direction) of the central laminate part 16 is transferred to the cover 60. Here, the vibration in the plane direction (d31 direction) of the central laminate part 16 is smaller than the vibration in the lamination direction (d33 direction). However, the vibration in the plane direction (d31) direction is added to the vibration in the lamination direction (d33 direction) of the central laminate part 16, by which large tactile vibration can be given to the whole cover 60.

Here, assuming that the loss factors tan $\delta_{(41)}$, tan $\delta_{(42)}$, and tan $\delta_{(43)}$ of the first elastic body 41, the second elastic body 42, and the third elastic body 43 are very large, the vibration may be absorbed by the first elastic body 41, the second elastic body 42, and the third elastic body 43 even if the central laminate part 16 stretches. In such a case, even if the central laminate part 16 stretches, the vibration is not transmitted to the cover 60.

However, in the present embodiment, the first elastic body 41, the second elastic body 42, and the third elastic body 43 use materials that have small loss factors tan $\delta_{(41)}$, tan $\delta_{(42)}$, and tan $\delta_{(43)}$. Therefore, the vibration generated by the stretch of the central laminate part 16 is hardly absorbed by the first elastic body 41, the second elastic body 42, and the third elastic body 43 and is transmitted to the cover 60.

Furthermore, the elastic modulus $E_{(41)}$ of the first elastic body 41 is smaller than the elastic modulus $E1_{(16)}$ in the lamination direction of the central laminate part 16. Therefore, in the initial state where no voltage is applied to the first electrode sheet 111 and the second electrode sheet 121, the central laminate part 16 is barely compressed. Accordingly, even if the cover 60 presses the central laminate part 16 in the lamination direction, it does not affect the stretch of the central laminate part 16 in the lamination direction. In other words, the central laminate part 16 can stretch reliably.

In addition, the elastic moduli $E_{(41)}$, $E_{(42)}$, and $E_{(43)}$ of the first elastic body 41, the second elastic body 42, and the third elastic body 43 are smaller than the elastic modulus $E2_{(16)}$ in the plane direction of the central laminate part 16. Therefore, in the initial state where no voltage is applied to the first electrode sheet 111 and the second electrode sheet 121, the central laminate part 16 is barely compressed. Accordingly, even if the cover 60 presses the central laminate part 16 in the plane direction, it does not affect the stretch of the central laminate part 16 in the plane direction. In other words, the central laminate part 16 can stretch reliably.

(1-5. Manufacturing Method of the Electrostatic Unit 10)

Figure 5:
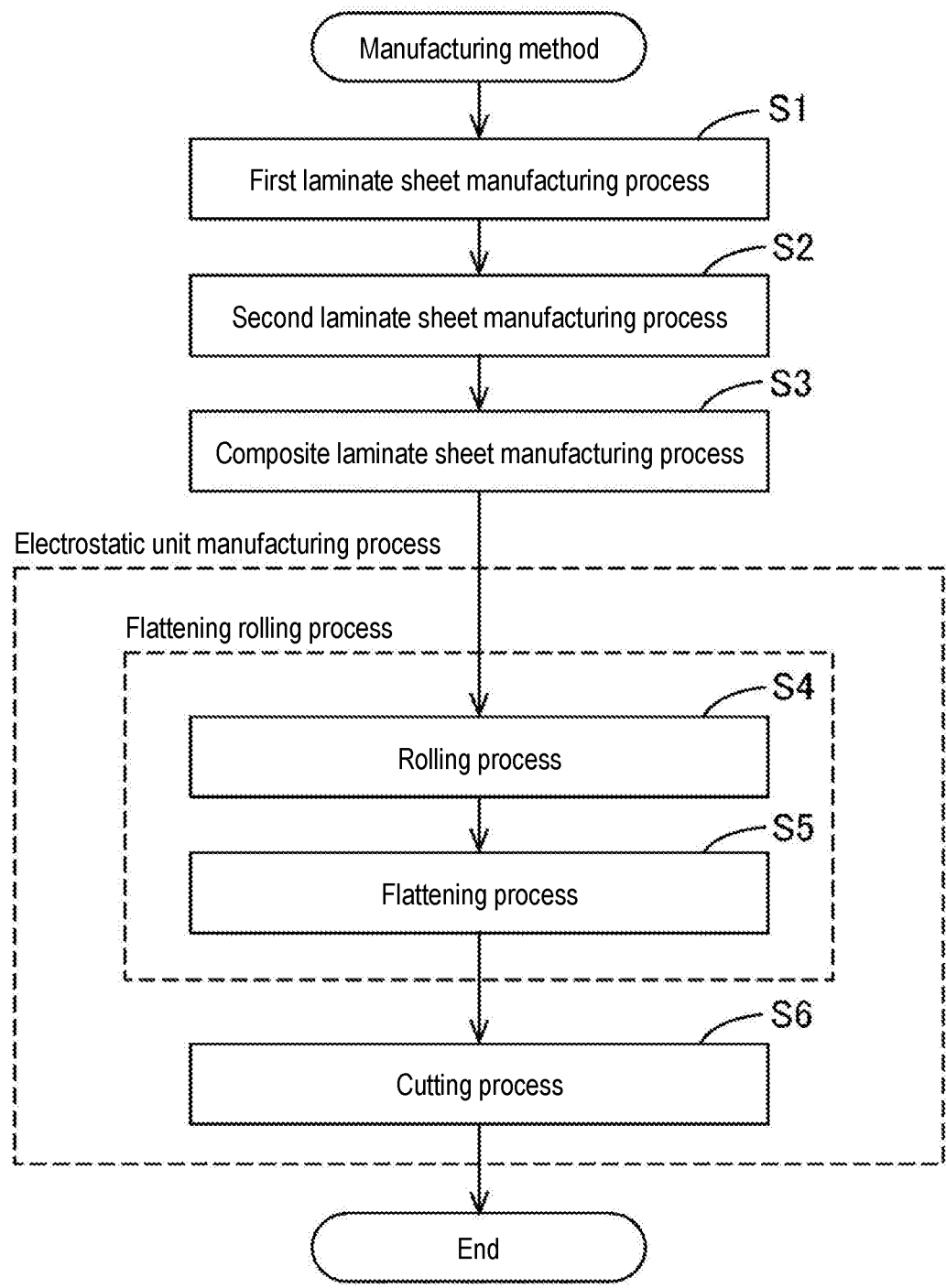
FIG. 5 is a flowchart showing the manufacturing method of the electrostatic unit 10.
Figure 6:
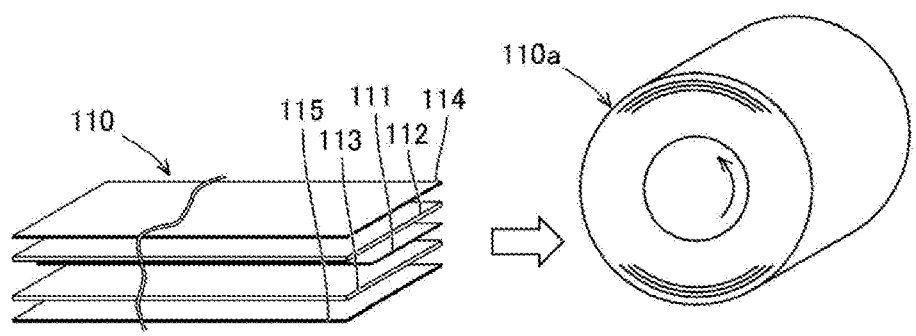
FIG. 6 is a view showing the first laminate sheet manufacturing process in S1 of FIG. 5.

A method of manufacturing the electrostatic unit 10 will be described with reference to FIG. 5 to FIG. 11. First, as shown in FIG. 5, the first laminate sheet 110 is manufactured (S1: first laminate sheet manufacturing process). As shown in FIG. 6, the first laminate sheet 110 is formed by laminating the first electrode sheet 111, two first dielectric sheets 112 and 113, and two separators 114 and 115.

The first electrode sheet 111 is formed in a band shape, that is, an elongated shape having a predetermined width. The two first dielectric sheets 112 and 113 and the two separators 114 and 115 are formed in a band shape, that is, an elongated shape having a predetermined width. The first electrode sheet 111 and the two first dielectric sheets 112 and 113 may be respectively formed in a sheet shape by printing a material on the surface of a sheet-shaped substrate (not shown), or may be formed of only the material in a sheet shape that can be present as a single body.

Here, the widths of the two first dielectric sheets 112 and 113 and the widths of the two separators 114 and 115 are larger than the width of the first electrode sheet 111. Here, as shown in FIG. 2 and FIG. 3, the second end laminate part 18 has the two first dielectric sheets 112 and 113 but does not have the first electrode sheet 111. That is, the two first dielectric sheets 112 and 113 and the two separators 114 and 115 are formed to be longer than the first electrode sheet 111 by the width corresponding to the second end laminate part 18 shown in FIG. 2 and FIG. 3. In addition, the lengths in the longitudinal direction of the two first dielectric sheets 112 and 113 and the lengths in the longitudinal direction of the two separators 114 and 115 are equal to the length in the longitudinal direction of the first electrode sheet 111.

As shown in FIG. 6, the two first dielectric sheets 112 and 113 are laminated on two surfaces of the first electrode sheet 111 with their first ends in the width direction aligned with the first end in the width direction of the first electrode sheet 111. On the other hand, the second ends in the width direction of the two first dielectric sheets 112 and 113 are positioned on the outer side in the width direction with respect to the second end in the width direction of the first electrode sheet 111. Further, the two separators 114 and 115 are laminated on the outer side surfaces of the two first dielectric sheets 112 and 113. At this time, the first electrode sheet 111, the two first dielectric sheets 112 and 113, and the two separators 114 and 115 are in a state where their two ends in the longitudinal direction coincide with each other.

In this way, the first laminate sheet 110 is formed by laminating five elongated sheets 111, 112, and 113 and separators 114 and 115. Then, the first laminate sheet 110 is wound into a roll shape to form a first laminate roll body 110a.

Figure 7:
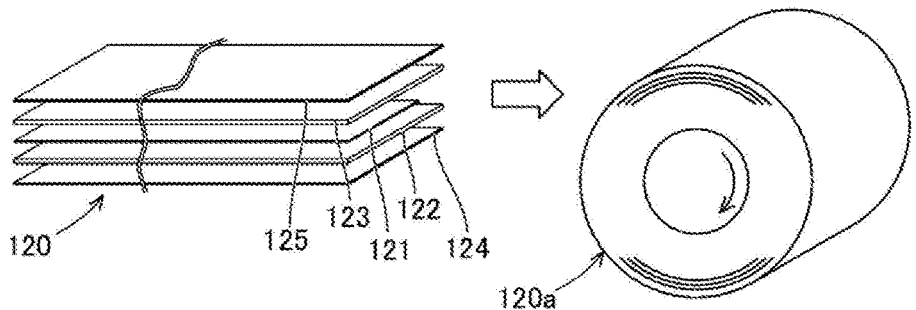
FIG. 7 is a view showing the second laminate sheet manufacturing process in S2 of FIG. 5.

Next, as shown in FIG. 5, the second laminate sheet 120 is manufactured (S2: second laminate sheet manufacturing process). As shown in FIG. 7, the second laminate sheet 120 is formed by laminating the second electrode sheet 121, two second dielectric sheets 122 and 123, and two separators 124 and 125.

The second electrode sheet 121 is formed in a band shape, that is, an elongated shape having a predetermined width. The two second dielectric sheets 122 and 123 and the two separators 124 and 125 are formed in a band shape, that is, an elongated shape having a predetermined width. The second electrode sheet 121 and the two second dielectric sheets 122 and 123 may be respectively formed in a sheet shape by printing a material on the surface of a sheet-shaped substrate (not shown), or may be formed of only the material in a sheet shape that can be present as a single body.

Here, the widths of the two second dielectric sheets 122 and 123 and the widths of the two separators 124 and 125 are larger than the width of the second electrode sheet 121. Here, as shown in FIG. 2 and FIG. 3, the first end laminate part 17 has the two second dielectric sheets 122 and 123 but does not have the second electrode sheet 121. That is, the two second dielectric sheets 122 and 123 and the two separators 124 and 125 are formed to be longer than the second electrode sheet 121 by the width corresponding to the first end laminate part 17 shown in FIG. 2 and FIG. 3. In addition, the lengths in the longitudinal direction of the two second dielectric sheets 122 and 123 and the lengths in the longitudinal direction of the two separators 124 and 125 are equal to the length in the longitudinal direction of the second electrode sheet 121.

As shown in FIG. 7, the two second dielectric sheets 122 and 123 are laminated on two surfaces of the second electrode sheet 121 with their first ends in the width direction aligned with the first end in the width direction of the second electrode sheet 121. On the other hand, the second ends in the width direction of the two second dielectric sheets 122 and 123 are positioned on the outer side in the width direction with respect to the second end in the width direction of the second electrode sheet 121. Further, the two separators 124 and 125 are laminated on the outer side surfaces of the two second dielectric sheets 122 and 123. At this time, the second electrode sheet 121, the two second dielectric sheets 122 and 123, and the two separators 124 and 125 are in a state where their two ends in the longitudinal direction coincide with each other.

In this way, the second laminate sheet 120 is formed by laminating five elongated sheets 121, 122, and 123 and separators 124 and 125. Then, the second laminate sheet 120 is wound into a roll shape to form a second laminate roll body 120a.

Next, as shown in FIG. 5, the composite laminate sheet 130 formed by laminating the first laminate sheet 110 and the second laminate sheet 120 is manufactured (S3: composite laminate sheet manufacturing process). Subsequently, the composite laminate sheet 130 is wound into a roll shape to form a composite laminate roll body 140 (S4: rolling process).

Figure 8:
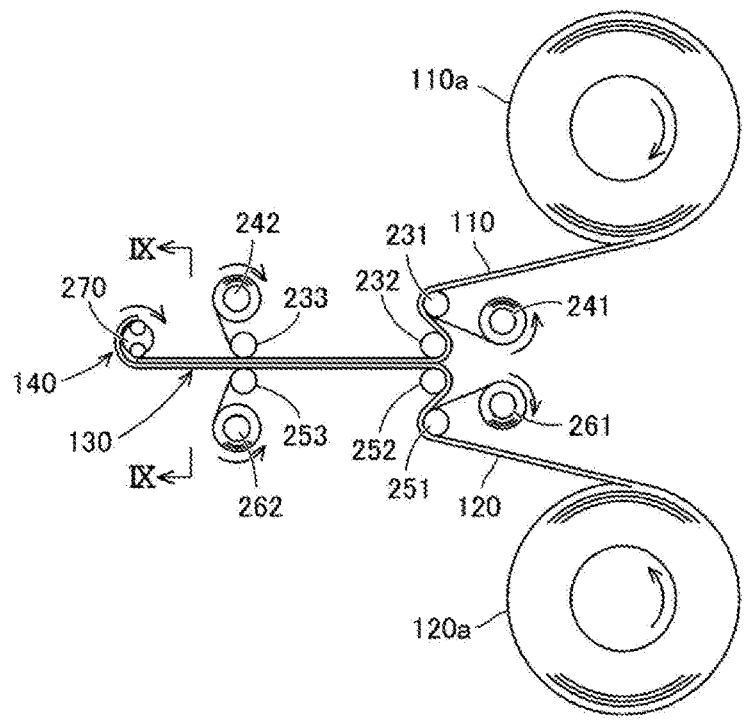
FIG. 8 is a view showing the composite laminate sheet manufacturing process in S3 and the rolling process in S4 of FIG. 5.

The composite laminate sheet manufacturing process and the rolling process are performed as shown in FIG. 8. The first laminate sheet 110 is drawn from the first laminate roll body 110a while it is supported by a plurality of rollers 231, 232, and 233. During this process, the two separators 114 and 115 are peeled off from the first laminate sheet 110 and wound around bobbins 241 and 242. Likewise, the second laminate sheet 120 is drawn from the second laminate roll body 120a while it is supported by a plurality of rollers 251, 252, and 253. During this process, the two separators 124 and 125 are peeled off from the second laminate sheet 120 and wound around bobbins 261 and 262.

Figure 9:
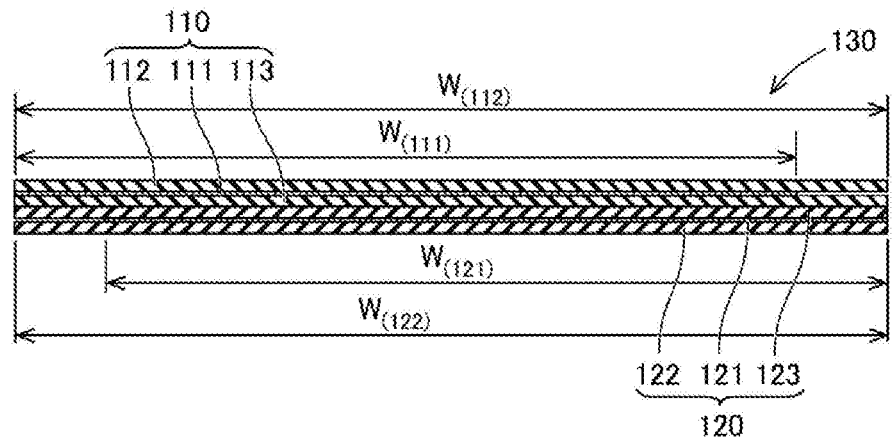
FIG. 9 is an enlarged cross-sectional view taken along the line IX-IX of FIG. 8.

The first laminate sheet 110 with the separators 114 and 115 peeled off and the second laminate sheet 120 with the separators 124 and 125 peeled off are laminated to form the composite laminate sheet 130 (S3: composite laminate sheet manufacturing process). As shown in FIG. 9, the composite laminate sheet 130 is formed of the first electrode sheet 111, two first dielectric sheets 112 and 113, the second electrode sheet 121, and two second dielectric sheets 122 and 123. Here, in FIG. 9, the width of the first electrode sheet 111 is $W_{(111)}$, the widths of the first dielectric sheets 112 and 113 are $W_{(112)}$, the width of the second electrode sheet 121 is $W_{(121)}$, and the widths of the second dielectric sheets 122 and 123 are $W_{(122)}$.

Specifically, in the composite laminate sheet 130, two ends of the first dielectric sheets 112 and 113 and the second dielectric sheets 122 and 123 in the width direction are aligned with each other. On the other hand, in the composite laminate sheet 130, the first electrode sheet 111 and the second electrode sheet 121 are offset in the width direction. That is, at the center in the width direction, the first electrode sheet 111 and the second electrode sheet 121 are present, but at the end in the width direction, only one of the first electrode sheet 111 and the second electrode sheet 121 is present.

Figure 10:
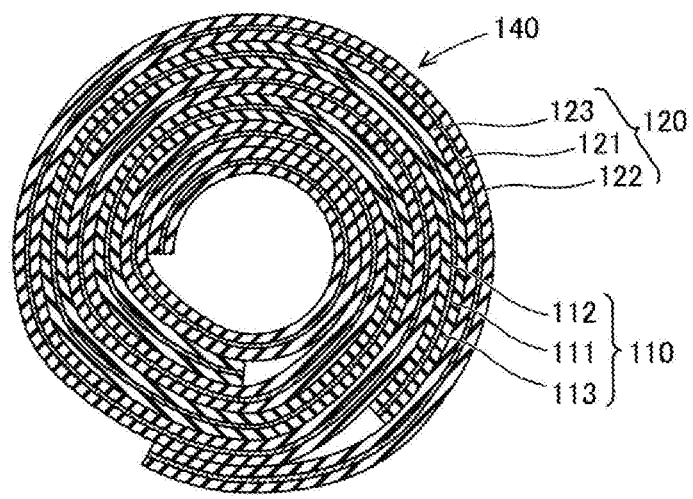
FIG. 10 is an enlarged cross-sectional view, in the direction orthogonal to the axial direction of the roll shape, with respect to the composite laminate roll body 140 after the rolling process in S4 of FIG. 5.

Then, by winding the composite laminate sheet 130 around a bobbin 270 shown in FIG. 8, the composite laminate roll body 140 shown in FIG. 10 is formed (S4: rolling process). The composite laminate roll body 140 is formed as shown in FIG. 10. At least one round of the innermost layer of the composite laminate roll body 140 is composed of only the first laminate sheet 110 or only the second laminate sheet 120. In the present embodiment, at least one round of the innermost layer is composed of only the second laminate sheet 120 connected to the ground potential. In the present embodiment, a range longer than one and a half rounds and shorter than two rounds of the innermost layer is composed of only the second laminate sheet 120. Furthermore, at least one round of the outermost layer of the composite laminate roll body 140 is composed of only the second laminate sheet 120 connected to the ground potential. In the present embodiment, a range longer than one round and shorter than one and a half rounds of the outermost layer is composed of only the second laminate sheet 120.

Figure 11:
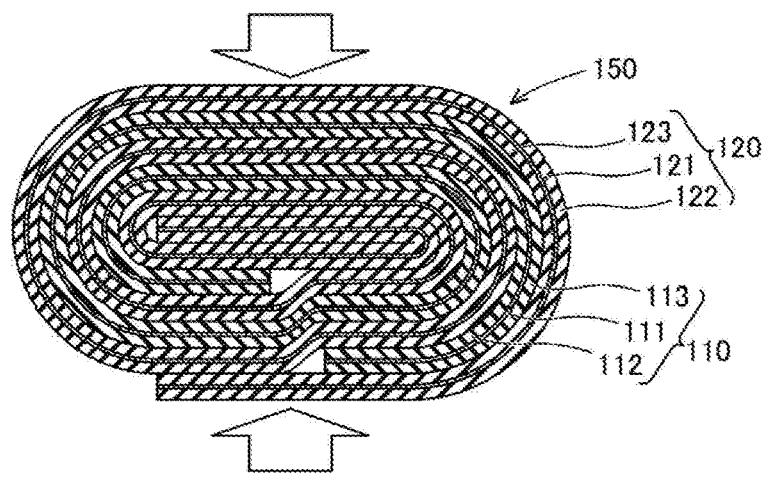
FIG. 11 is an enlarged cross-sectional view, in the direction orthogonal to the axial direction of the roll shape, with respect to the flat roll body 150 after the flattening process in S5 of FIG. 5.

Next, as shown in FIG. 5 and FIG. 11, the composite laminate roll body 140 is flattened to form a flat roll body 150 (S5: flattening process). In the flat roll body 150, at least one round of the innermost layer is composed of only the second laminate sheet 120 connected to the ground potential. Further, at least one round of the outermost layer of the flat roll body 150 is composed of only the second laminate sheet 120 connected to the ground potential.

Subsequently, as shown in FIG. 5, two ends of the flat roll body 150 in the axial direction of the roll shape are slightly cut to form the electrostatic unit 10. Specifically, the first end in the axial direction of the flat roll body 150 is cut to expose the end of the first electrode sheet 111 (S6: cutting process). Further, the second end in the axial direction of the flat roll body 150 is cut to expose the end of the second electrode sheet 121 (S6: cutting process). Depending on the positioning accuracy in the manufacturing of the first laminate sheet 110, the second laminate sheet 120, and the composite laminate sheet 130, the first electrode sheet 111 and the second electrode sheet 121 may not be exposed on the flat roll body 150. In such a case, the first electrode sheet 111 and the second electrode sheet 121 are reliably exposed by the cutting.

In the manufactured electrostatic unit 10, at least one round of the innermost layer is composed of only the second laminate sheet 120 connected to the ground potential. Thus, the separation distance between the first electrode sheet 111 and the second electrode sheet 121 can be set equal to or longer than a predetermined distance. Furthermore, in the electrostatic unit 10, at least one round of the outermost layer is composed of only the second laminate sheet 120 connected to the ground potential. Therefore, the formed electrostatic transducer 1 is highly safe.

In FIG. 5, the rolling process of S4, the flattening process of S5, and the cutting process of S6 are referred to as an electrostatic unit manufacturing process. Furthermore, in FIG. 5, the rolling process of S4 and the flattening process of S5 are referred to as a flattening rolling process.

(1-6. Effect)

As described above, the electrostatic transducer 1 includes the electrostatic unit 10. The electrostatic unit 10 includes the first laminate sheet 110 and the second laminate sheet 120.

Then, the first laminate sheet 110 includes the first electrode sheet 111 and two first dielectric sheets 112 and 113. The first electrode sheet 111 is formed in a band shape. The two first dielectric sheets 112 and 113 are formed in a band shape and have widths larger than the width of the first electrode sheet 111. The two first dielectric sheets 112 and 113 are laminated on two surfaces of the first electrode sheet 111 with their first ends in the width direction aligned with the first end in the width direction of the first electrode sheet 111. The second laminate sheet 120 includes the second electrode sheet 121 and two second dielectric sheets 122 and 123. The second electrode sheet 121 is formed in a band shape. The two second dielectric sheets 122 and 123 are formed in a band shape and have widths larger than the width of the second electrode sheet 121. The two second dielectric sheets 122 and 123 are laminated on two surfaces of the second electrode sheet 121 with their first ends in the width direction aligned with the first end in the width direction of the second electrode sheet 121.

Further, the electrostatic unit 10 is in a state of being wound into a roll shape from the first laminate sheet 110 and the second laminate sheet 120 and is flattened into a flat shape. The first laminate sheet 110 is in a state of being wound into a roll shape and is flattened into a flat shape. The second laminate sheet 120 is in a state of being laminated on the first laminate sheet 110 and wound into a roll shape together with the first laminate sheet 110, and is flattened into a flat shape. The first electrode sheet 111 and the second electrode sheet 121 are offset in the width direction. The first electrode sheet 111 is exposed on the first end surface in the axial direction of the roll shape and the second electrode sheet 121 is exposed on the second end surface in the axial direction of the roll shape.

According to the electrostatic transducer 1, the electrostatic unit 10 is in a state of being wound into a roll shape from the first laminate sheet 110 and the second laminate sheet 120 and is flattened into a flat shape. Therefore, a large number of the electrode sheets 111 and 121 and a large number of the dielectric sheets 112, 113, 122, and 123 can be laminated easily. Further, the first laminate sheet 110 constituting the electrostatic unit 10 sandwiches the first electrode sheet 111 with the two first dielectric sheets 112 and 113. Accordingly, in the first laminate sheet 110, the planar portion of the first electrode sheet 111 is covered by the two first dielectric sheets 112 and 113. That is, in the first laminate sheet 110, the entire surface of the planar portion of the first electrode sheet 111 is not exposed. The same applies to the second laminate sheet 120. Therefore, the first laminate sheet 110 and the second laminate sheet 120 are easy to handle and it is possible to suppress occurrence of defects on the first electrode sheet 111 and the second electrode sheet 121.

In addition, at least one round of the innermost layer of the roll shape of the electrostatic unit 10 is composed of only the first laminate sheet 110 or only the second laminate sheet 120. Thus, the separation distance between the first electrode sheet 111 and the second electrode sheet 121 can be set equal to or longer than the predetermined distance. In other words, the performance of the electrostatic transducer 1 can be improved.

Moreover, in the electrostatic unit 10, the second electrode sheet 121 is connected to the ground potential, and at least one round of the outermost layer of the roll shape of the electrostatic unit 10 is composed of only the second laminate sheet 120 connected to the ground potential. Thus, the formed electrostatic transducer 1 is highly safe.

Furthermore, the electrostatic transducer 1 is manufactured by the first laminate sheet manufacturing process (S1), the second laminate sheet manufacturing process (S2), the composite laminate sheet manufacturing process (S3), and the flattening rolling process (S4 and S5).

The first laminate sheet manufacturing process manufactures the first laminate sheet 110. The second laminate sheet manufacturing process manufactures the second laminate sheet 120. The composite laminate sheet manufacturing process manufactures the composite laminate sheet 130 formed by laminating the first laminate sheet 110 and the second laminate sheet 120. The flattening rolling process manufactures the flat roll body 150 formed by winding the composite laminate sheet 130 into a roll shape and flattening it into a flat shape.

With the manufacturing method, the electrostatic unit 10 described above can be manufactured. That is, the first laminate sheet 110 manufactured by the first laminate sheet manufacturing process is configured by sandwiching the first electrode sheet 111 with the two first dielectric sheets 112 and 113. Accordingly, in the first laminate sheet 110, the planar portion of the first electrode sheet 111 is covered by the two first dielectric sheets 112 and 113. That is, in the first laminate sheet 110, the entire surface of the planar portion of the first electrode sheet 111 is not exposed. The same applies to the second laminate sheet 120. Therefore, the first laminate sheet 110 and the second laminate sheet 120 are easy to handle, and it is possible to suppress occurrence of defects on the first electrode sheet 111 and the second electrode sheet 121. Then, in the flattening rolling process, the composite laminate sheet 130 formed by laminating the first laminate sheet 110 and the second laminate sheet 120 is wound into a roll shape and flattened into a flat shape. Accordingly, a large number of electrode sheets 111 and 121 and a large number of dielectric sheets 112, 113, 122, and 123 can be laminated easily.

Further, the electrostatic transducer 1 is manufactured by the cutting process (S6), which cuts the first end and the second end in the axial direction of the roll shape of the flat roll body 150 to expose the first electrode sheet 111 and the second electrode sheet 121. Since it ensures that the first electrode sheet 111 and the second electrode sheet 121 are exposed, the electrostatic transducer 1 has good conductivity.

In addition, the electrostatic transducer 1 further includes the first elastic body 41 that covers at least the flat surface of the outer peripheral surface of the roll shape of the electrostatic unit 10. Furthermore, the electrostatic transducer 1 includes the cover 60 that presses the electrostatic unit 10 at least in the lamination direction (the vertical direction in FIG. 1) and holds the first elastic body 41 in a state of compressing it to a greater extent than the electrostatic unit 10 in the lamination direction. Thus, even though the electrostatic unit 10 alone generates small vibration, large vibration can be given to the cover 60 in the lamination direction of the electrostatic unit 10.

Particularly, the first elastic body 41 may cover the entire outer peripheral surface of the roll shape of the electrostatic unit 10. In this case, the cover 60 also presses the electrostatic unit 10 in the plane direction (the left-right direction in FIG. 1) in addition to the lamination direction. Then, the cover 60 holds the first elastic body 41 in a state of compressing it to a greater extent than the electrostatic unit 10 in the plane direction. Thus, small vibration of the electrostatic unit 10 in the plane direction of the electrostatic unit 10 can be reliably transmitted to the cover 60.

Also, the elastic modulus $E_{(41)}$ of the first elastic body 41 is smaller than the elastic modulus $E1_{(16)}$ of the central laminate part 16 of the electrostatic unit 10. That is, in the initial state, in the state where the central laminate part 16 and the first elastic body 41 are pressed by the cover 60, the compression amount of the central laminate part 16 is small. Therefore, even if the central laminate part 16 is pressed by the cover 60, it does not significantly affect the stretch of the central laminate part 16.

Then, when a voltage is applied to the first electrode sheet 111 and the second electrode sheet 121 of the central laminate part 16, the central laminate part 16 stretches in the lamination direction and the plane direction. The displacement of the plane of the central laminate part 16 caused by the stretch of the central laminate part 16 is transmitted to the cover 60 via the first elastic body 41. In addition, the elastic deformation force of the first elastic body 41 changes due to the stretch of the central laminate part 16, and the change of the elastic deformation force of the first elastic body 41 is transmitted to the cover 60. Accordingly, as the initial state, since the first elastic body 41 is compressed, the vibration can be efficiently transferred to the cover 60. That is, even though the central laminate part 16 of the electrostatic unit 10 alone generates small vibration, tactile vibration can be given to the cover 60.

Furthermore, the first elastic body 41 uses a material having the small loss factor $\tan \delta_{(41)}$. Thus, the first elastic body 41 can transmit the vibration generated by the stretch of the central laminate part 16 to the cover 60 without absorbing it. Particularly, the above operation can be realized reliably by using silicone rubber to form the first elastic body 41.

In addition, the loss factor tan $\delta_{(41)}$ of the first elastic body 41 is set to be equal to or smaller than the loss factor tan $\delta_{(16)}$ of the central laminate part 16 of the electrostatic unit 10 under the predetermined condition. As described above, the predetermined condition refers to an environment of use where the temperature is set to −10° C. to 50° C. and the vibration frequency is set to 300 Hz or less. Thus, the first elastic body 41 can reliably transmit the vibration generated by the stretch of the central laminate part 16 to the cover 60 without absorbing it.

2. Second Embodiment

In the second embodiment, the outermost layer of the roll shape of the electrostatic unit 10 is formed with an elastic modulus larger than that of the inside of the roll shape of the electrostatic unit 10. For example, by applying UV irradiation to surface-modify the outermost layer of the electrostatic unit 10 manufactured by S1 to S6 of FIG. 5, a nano-order cured layer is formed. A sheet having a desired elastic modulus may be disposed instead of applying UV irradiation. Therefore, when the vibration of the electrostatic unit 10 is transmitted to the cover 60, the transmission sensitivity of the vibration is improved. As a result, the vibration generated by the stretch of the central laminate part 16 of the electrostatic unit 10 is more efficiently transmitted to the cover 60.

Particularly, the outermost layer of the central laminate part 16 may be a layer surface-modified by UV irradiation. Therefore, the outermost layer can be very thin and have a nano-order thickness. Thus, the transmission efficiency of the vibration generated by the stretch can be improved without hindering the stretch itself of the central laminate part 16.

3. Third Embodiment

Figure 12:
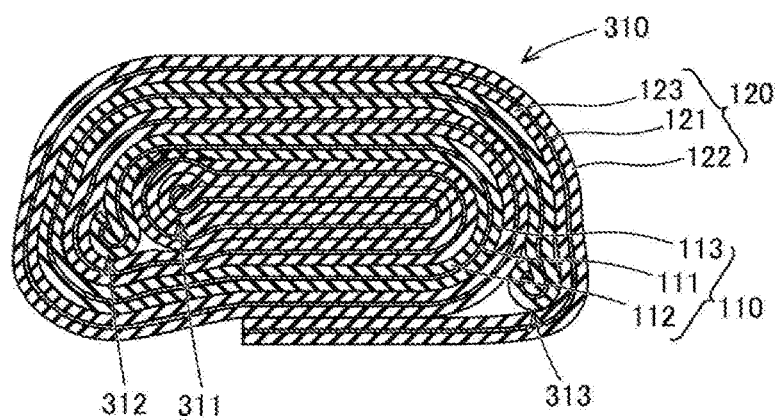
FIG. 12 is a cross-sectional view, in the direction orthogonal to the axial direction of the roll shape, with respect to the electrostatic unit 310 of the second embodiment.

An electrostatic unit 310 of the third embodiment will be described with reference to FIG. 12. In the electrostatic unit 310, as shown in FIG. 12, an end on the inner layer side of the roll shape is curled with a curvature radius smaller than that of the roll shape. That is, the end of the second laminate sheet 120 on the inner layer side is curled to form a first curled part 311. In other words, the second electrode sheet 121 at the end of the second laminate sheet 120 on the inner layer side is in contact with the second dielectric sheets 122 and 123. Therefore, it is possible to ensure that the separation distance between the ends of the first electrode sheet 111 and the second electrode sheet 121 on the inner layer side is equal to or longer than the predetermined distance. As a result, the insulation state between the ends of the first electrode sheet 111 and the second electrode sheet 121 on the inner layer side is secured.

Further, an end of the first laminate sheet 110 on the inner layer side and an end of the first laminate sheet 110 on the outer layer side are curled to form a second curled part 312 and a third curled part 313. In other words, the first electrode sheet 111 at the ends of the first laminate sheet 110 on the inner layer side and the outer layer side is in contact with the first dielectric sheets 112 and 113. Therefore, it is possible to ensure that the separation distance between the end of the first electrode sheet 111 on the inner layer side and the second electrode sheet 121 is equal to or longer than the predetermined distance. Likewise, it is possible to ensure that the separation distance between the end of the first electrode sheet 111 on the outer layer side and the second electrode sheet 121 is equal to or longer than the predetermined distance. As a result, the insulation state between the two ends of the first electrode sheet 111 and the second electrode sheet 121 is secured.

The curled parts 311, 312, and 313 are preferably formed by hooking the respective ends of the first laminate sheet 110 and the second laminate sheet 120 to hooks (not shown) or the like provided on the bobbin 270 shown in FIG. 8. In other words, the curled parts 311, 312, and 313 are formed in the process of winding the composite laminate sheet 130 formed by laminating the first laminate sheet 110 and the second laminate sheet 120 into a roll shape.

As described above, in the electrostatic unit 310, at least one of the first end and the second end in the longitudinal direction of the band shape of at least one of the first laminate sheet 110 and the second laminate sheet 120 is curled with a curvature radius smaller than that of the roll shape of the electrostatic unit 310. It is possible to ensure that the separation distance between the first electrode sheet 111 and the second electrode sheet 121 is equal to or longer than the predetermined distance at the curled portions.

Particularly, the end of the first laminate sheet 110 on the inner layer side of the roll shape is curled, and the end of the second laminate sheet 120 on the inner layer side of the roll shape is curled. Thus, it is possible to ensure that the separation distance between the first electrode sheet 111 and the second electrode sheet 121 is equal to or longer than the predetermined distance at the two tips on the inner layer side where an insulation state needs to be secured.

Furthermore, the ends of the first laminate sheet 110 and the second laminate sheet 120, which are not positioned in the outermost layer of the roll shape, are curled. In other words, all the ends positioned inside the electrostatic unit 310 are curled. Accordingly, it is possible to ensure that the separation distance between the first electrode sheet 111 and the second electrode sheet 121 is equal to or longer than the predetermined distance inside the electrostatic unit 310.

The end of the second laminate sheet 120 on the outer layer side, which is positioned in the outermost layer of the electrostatic unit 310, is not curled. However, since at least one round of the outermost layer of the electrostatic unit 310 is formed of the second laminate sheet 120 connected to the ground potential, there is a sufficient separation distance from the first electrode sheet 111 at the end of the second laminate sheet 120 on the outer layer side. Nevertheless, all the end parts (four end parts) may be curled.

4. Fourth Embodiment (4-1. Configuration of the Electrostatic Unit)

An electrostatic unit 450 of the fourth embodiment will be described with reference to FIG. 13. The electrostatic unit 450 includes a first laminate sheet 410 and a second laminate sheet 420. Here, the first laminate sheet 410 and the second laminate sheet 420 correspond to the first laminate sheet 110 and the second laminate sheet 120 of the first embodiment. However, the first laminate sheet 410 and the second laminate sheet 420 differ from the first laminate sheet 110 and the second laminate sheet 120 of the first embodiment in the following points.

The first laminate sheet 410 is composed of the first electrode sheet 111 and two first dielectric sheets 112 and 113. However, in the first laminate sheet 410, two ends in the longitudinal direction of the band shape of each of the two first dielectric sheets 112 and 113 are positioned on the outer side in the longitudinal direction with respect to two ends in the longitudinal direction of the band shape of the first electrode sheet 111. In other words, two ends in the longitudinal direction of the band shape of the first electrode sheet 111 are enclosed by the two first dielectric sheets 112 and 113.

That is, in the state where the first laminate sheet 410 is wound into a roll shape, the end of the first laminate sheet 410 on the inner layer side and the end of the first laminate sheet 410 on the outer layer side are formed of only the two first dielectric sheets 112 and 113. Accordingly, the portion where the first electrode sheet 111 is exposed is at only the first end in the width direction (the left side in FIG. 2). Then, the second end (the right side in FIG. 2) in the width direction and two ends in the longitudinal direction of the first electrode sheet 111 are enclosed by the two first dielectric sheets 112 and 113 and are not exposed.

Thus, in the electrostatic unit 450, it is possible to ensure that the separation distance between the end of the first electrode sheet 111 on the inner layer side and the second electrode sheet 121, and the separation distance between the end of the first electrode sheet 111 on the outer layer side and the second electrode sheet 121 are equal to or longer than the predetermined distance. As a result, the insulation state between the end of the first electrode sheet 111 on the inner layer side and the second electrode sheet 121 is secured and the insulation state between the end of the first electrode sheet 111 on the outer layer side and the second electrode sheet 121 is secured.

In addition, the second laminate sheet 420 is composed of the second electrode sheet 121 and two second dielectric sheets 122 and 123. However, in the second laminate sheet 420, two ends in the longitudinal direction of the band shape of each of the two second dielectric sheets 122 and 123 are positioned on the outer side in the longitudinal direction with respect to two ends in the longitudinal direction of the band shape of the second electrode sheet 121. In other words, two ends in the longitudinal direction of the band shape of the second electrode sheet 121 are enclosed by the two second dielectric sheets 122 and 123.

That is, in the state where the second laminate sheet 420 is wound into a roll shape, the end of the second laminate sheet 420 on the inner layer side and the end of the second laminate sheet 420 on the outer layer side are formed of only the two second dielectric sheets 122 and 123. Accordingly, the portion where the second electrode sheet 121 is exposed is at only the first end in the width direction (the right side in FIG. 2). Then, the second end (the left side in FIG. 2) in the width direction and two ends in the longitudinal direction of the second electrode sheet 121 are enclosed by the two second dielectric sheets 122 and 123 and are not exposed.

Thus, in the electrostatic unit 450, it is possible to ensure that the separation distance between the first electrode sheet 111 and the end of the second electrode sheet 121 on the inner layer side, and the separation distance between the first electrode sheet 111 and the end of the second electrode sheet 121 on the outer layer side are equal to or longer than the predetermined distance. As a result, the insulation state between the first electrode sheet 111 and the end of the second electrode sheet 121 on the inner layer side is secured and the insulation state between the first electrode sheet 111 and the end of the second electrode sheet 121 on the outer layer side is secured.

Here, in the above description, the two ends in the longitudinal direction of the band shape of the first electrode sheet 111 are enclosed by the two first dielectric sheets 112 and 113, and the two ends in the longitudinal direction of the band shape of the second electrode sheet 121 are enclosed by the two second dielectric sheets 122 and 123. Moreover, the two ends in the longitudinal direction of the band shape of the first electrode sheet 111 connected to the positive electrode potential may be enclosed by the two first dielectric sheets 112 and 113, and the end on the inner layer side of the second electrode sheet 121 connected to the ground potential may be enclosed by the two second dielectric sheets 122 and 123. In this case, the end on the outer layer side of the second electrode sheet 121 connected to the ground potential is not enclosed by the two second dielectric sheets 122 and 123 and is exposed. In other words, all the electrodes at the ends positioned inside the electrostatic unit 450 are not exposed. Accordingly, it is possible to ensure that the separation distance between the first electrode sheet 111 and the second electrode sheet 121 is equal to or longer than the predetermined distance inside the electrostatic unit 450.

Furthermore, it is possible that only the two ends in the longitudinal direction of the band shape of the first electrode sheet 111 connected to the positive electrode potential are enclosed by the two first dielectric sheets 112 and 113. In such a case, the two ends in the longitudinal direction of the band shape of the second electrode sheet 121 connected to the ground potential are not enclosed by the two second dielectric sheets 122 and 123 and are exposed.

(4-2. Manufacturing Method of the Electrostatic Unit 450)

A method of manufacturing the electrostatic unit 450 will be described with reference to FIG. 14 to FIG. 19. The manufacturing method of the electrostatic unit 450 has the same procedure as the manufacturing method of the electrostatic unit 10 of the first embodiment shown in FIG. 5. However, in the manufacturing method of the electrostatic unit 450, the process of manufacturing the first laminate sheet 410 (S1 of FIG. 5) and the process of manufacturing the second laminate sheet 420 (S2 of FIG. 5) are different.

Figure 14:
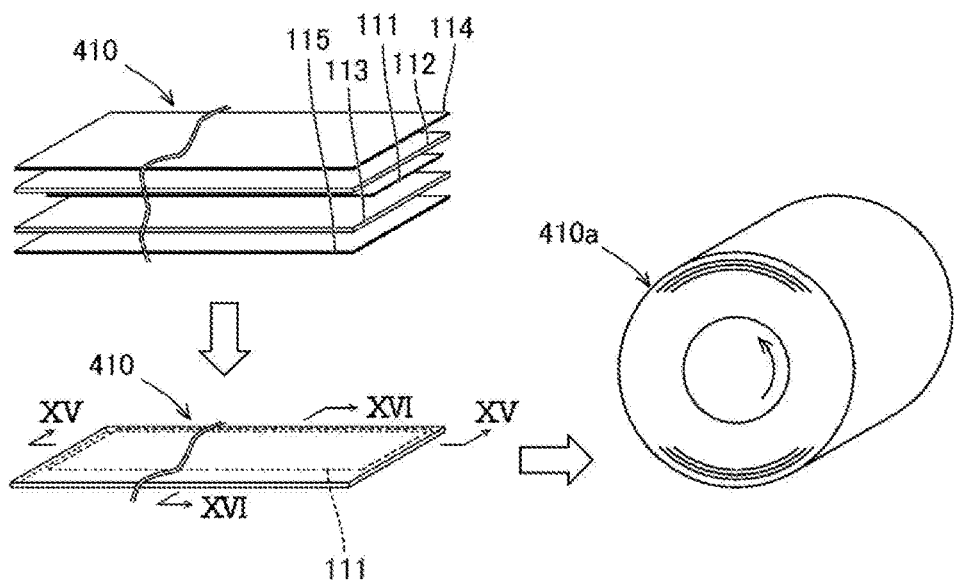
FIG. 14 is a view showing the first laminate sheet manufacturing process in the manufacturing method of the electrostatic unit 450 of the third embodiment.

In the manufacturing process of the first laminate sheet 410, as shown in FIG. 14, the first electrode sheet 111, the two first dielectric sheets 112 and 113, and the two separators 114 and 115 are formed in a band shape, that is, an elongated shape having a predetermined width. The first electrode sheet 111 and the two first dielectric sheets 112 and 113 may be respectively formed in a sheet shape by printing a material on the surface of a sheet-shaped substrate (not shown), or may be formed of only the material in a sheet shape that can be present as a single body.

Here, the lengths in the longitudinal direction of the two first dielectric sheets 112 and 113 and the lengths in the longitudinal direction of the two separators 114 and 115 are larger than the length in the longitudinal direction of the first electrode sheet 111. Moreover, the widths of the two first dielectric sheets 112 and 113 and the widths of the two separators 114 and 115 are larger than the width of the first electrode sheet 111.

Subsequently, the first laminate sheet 410 is manufactured by laminating the separator 114, the first dielectric sheet 112, the first electrode sheet 111, the first dielectric sheet 113, and the separator 115 in this order. Here, as shown in FIG. 15, the length $L_{(111)}$ in the longitudinal direction of the band shape of the first electrode sheet 111 is smaller than the length $L_{(112)}$ in the longitudinal direction of the band shape of each of the two first dielectric sheets 112 and 113 by a length that is twice $\Delta L_{(111)}$.

Figure 15:
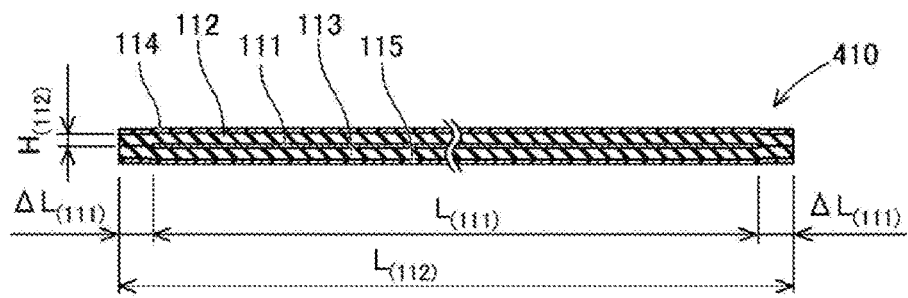
FIG. 15 is a cross-sectional view taken along the line XV-XV of FIG. 14, showing a state where the plane direction of the first laminate sheet coincides with the lateral direction of the drawing.

Then, as shown in FIG. 15, in the cross section parallel to the longitudinal direction of the first laminate sheet 410, the two ends in the longitudinal direction of the band shape of each of the two first dielectric sheets 112 and 113 are positioned on the outer side in the longitudinal direction with respect to the two ends in the longitudinal direction of the band shape of the first electrode sheet 111. Specifically, the length from the first end (the right end in FIG. 15) in the longitudinal direction of the band shape of each of the two first dielectric sheets 112 and 113 to the first end in the longitudinal direction of the band shape of the first electrode sheet 111 is $\Delta L_{(111)}$. Likewise, the length from the second end (the left end in FIG. 15) in the longitudinal direction of the band shape of each of the two first dielectric sheets 112 and 113 to the second end in the longitudinal direction of the band shape of the first electrode sheet 111 is also $\Delta L_{(111)}$. Here, the thickness of the first dielectric sheet 112 is $H_{(112)}$. The thickness of the other first dielectric sheet 113 is the same as the thickness of the first dielectric sheet 112. Then, the length $\Delta L_{(111)}$ is set equal to or larger than the thickness $H_{(112)}$.

Therefore, in the cross section parallel to the longitudinal direction of the first laminate sheet 410, the distances between the first electrode sheet 111 and the surfaces of the two first dielectric sheets 112 and 113 are equal to or larger than the thickness $H_{(112)}$ of each of the first dielectric sheets 112 and 113 at all positions. As a result, the insulation state of the first electrode sheet 111 can be secured.

Figure 16:
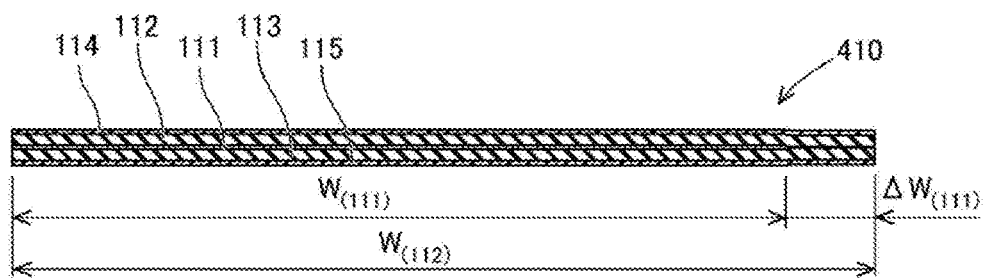
FIG. 16 is a cross-sectional view taken along the line XVI-XVI of FIG. 14, showing a state where the plane direction of the first laminate sheet coincides with the lateral direction of the drawing.

Further, as shown in FIG. 16, in the cross section parallel to the width direction of the first laminate sheet 410, the width $W_{(111)}$ of the first electrode sheet 111 is smaller than the width $W_{(112)}$ of each of the first dielectric sheets 112 and 113 by the width $\Delta W_{(111)}$. Then, the first end (the left end in FIG. 16) in the width direction of the first electrode sheet 111 coincides with the first end in the width direction of each of the two first dielectric sheets 112 and 113. Then, the first laminate sheet 410 is wound into a roll shape to form a first laminate roll body 410a.

Figure 17:
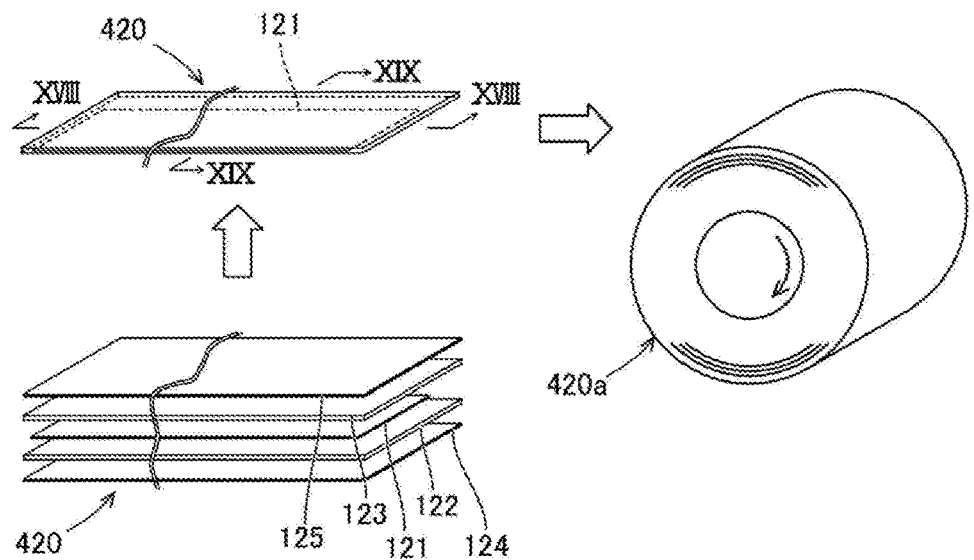
FIG. 17 is a view showing the second laminate sheet manufacturing process in the manufacturing method of the electrostatic unit 450 of the third embodiment.

In the manufacturing process of the second laminate sheet 420, as shown in FIG. 17, the second electrode sheet 121, the two second dielectric sheets 122 and 123, and the two separators 124 and 125 are formed in a band shape, that is, an elongated shape having a predetermined width. The second electrode sheet 121 and the two second dielectric sheets 122 and 123 may be respectively formed in a sheet shape by printing a material on the surface of a sheet-shaped substrate (not shown), or may be formed of only the material in a sheet shape that can be present as a single body.

Here, the lengths in the longitudinal direction of the two second dielectric sheets 122 and 123 and the lengths in the longitudinal direction of the two separators 124 and 125 are larger than the length in the longitudinal direction of the second electrode sheet 121. Moreover, the widths of the two second dielectric sheets 122 and 123 and the widths of the two separators 124 and 125 are larger than the width of the second electrode sheet 121.

Subsequently, the second laminate sheet 420 is manufactured by laminating the separator 124, the second dielectric sheet 122, the second electrode sheet 121, the second dielectric sheet 123, and the separator 125 in this order. Here, as shown in FIG. 18, the length $L_{(121)}$ in the longitudinal direction of the band shape of the second electrode sheet 121 is smaller than the length $L_{(122)}$ in the longitudinal direction of the band shape of each of the two second dielectric sheets 122 and 123 by a length that is twice $\Delta L_{(121)}$.

Figure 18:
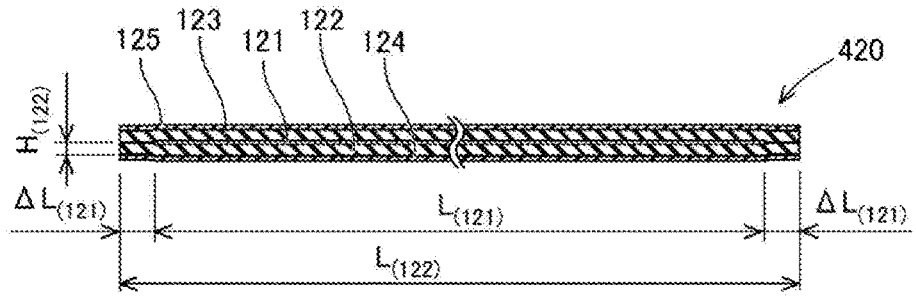
FIG. 18 is a cross-sectional view taken along the line XVIII-XVIII of FIG. 17, showing a state where the plane direction of the second laminate sheet coincides with the lateral direction of the drawing.

Then, as shown in FIG. 18, in the cross section parallel to the longitudinal direction of the second laminate sheet 420, the two ends in the longitudinal direction of the band shape of each of the two second dielectric sheets 122 and 123 are positioned on the outer side in the longitudinal direction with respect to the two ends in the longitudinal direction of the band shape of the second electrode sheet 121. Specifically, the length from the first end (the right end in FIG. 18) in the longitudinal direction of the band shape of each of the two second dielectric sheets 122 and 123 to the first end in the longitudinal direction of the band shape of the second electrode sheet 121 is $\Delta L_{(121)}$. Likewise, the length from the second end (the left end in FIG. 18) in the longitudinal direction of the band shape of each of the two second dielectric sheets 122 and 123 to the second end in the longitudinal direction of the band shape of the second electrode sheet 121 is also $\Delta L_{(121)}$. Here, the thickness of the second dielectric sheet 122 is $H_{(122)}$. The thickness of the other second dielectric sheet 123 is the same as the thickness of the second dielectric sheet 122. Then, the length $\Delta L_{(121)}$ is set equal to or larger than the thickness $H_{(122)}$.

Therefore, in the cross section parallel to the longitudinal direction of the second laminate sheet 420, the distances between the second electrode sheet 121 and the surfaces of the two second dielectric sheets 122 and 123 are equal to or larger than the thickness $H_{(122)}$ of each of the second dielectric sheets 122 and 123 at all positions. As a result, the insulation state of the second electrode sheet 121 can be secured.

Figure 19:
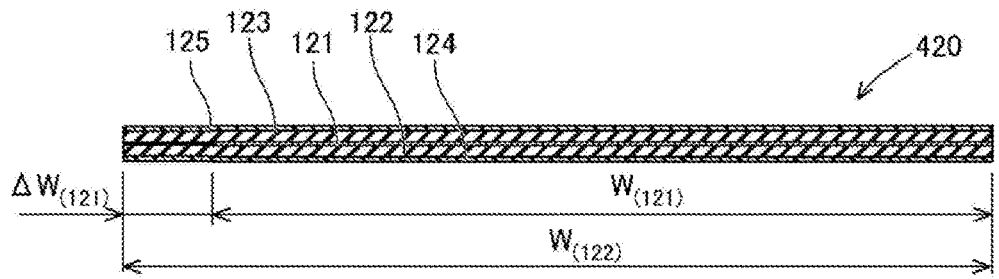
FIG. 19 is a cross-sectional view taken along the line XIX-XIX of FIG. 17, showing a state where the plane direction of the second laminate sheet coincides with the lateral direction of the drawing.

Further, as shown in FIG. 19, in the cross section parallel to the width direction of the second laminate sheet 420, the width $W_{(121)}$ of the second electrode sheet 121 is smaller than the width $W_{(122)}$ of each of the second dielectric sheets 122 and 123 by the width $\Delta W_{(121)}$. Then, the first end (the right end in FIG. 19) in the width direction of the second electrode sheet 121 coincides with the first end in the width direction of each of the two second dielectric sheets 122 and 123. Then, the second laminate sheet 420 is wound into a roll shape to form a second laminate roll body 420a.

Figure 13:
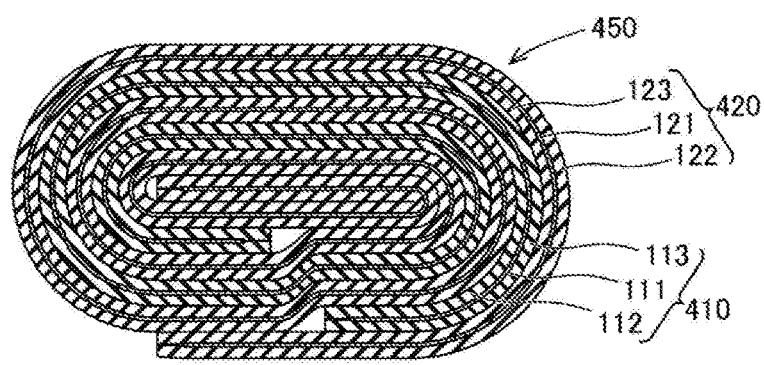
FIG. 13 is a cross-sectional view, in the direction orthogonal to the axial direction of the roll shape, with respect to the electrostatic unit 450 of the third embodiment.

After the first laminate sheet manufacturing process (S1) and the second laminate sheet manufacturing process (S2), as in the first embodiment, the composite laminate sheet manufacturing process (S3) and the flattening rolling process (S4 and S5) in FIG. 5 are performed, by which the electrostatic unit 450 shown in FIG. 13 is manufactured.

5. Others

In the above embodiment, the first elastic body 41 covers the entire outer peripheral surface of the roll shape of the electrostatic unit 10, as shown in FIG. 1. However, the disclosure is not limited thereto, and the first elastic body 41 may cover only the flat surface of the outer peripheral surface of the electrostatic unit 10. In such a case, the second cover 62 is in a state that it does not compress the surfaces (the left and right surfaces in FIG. 1) adjacent to the flat surface of the outer peripheral surface of the roll shape of the electrostatic unit 10 in the plane direction of the electrostatic unit 10.

Further, in the above embodiment, as shown in FIG. 1, the first elastic body 41 covers the entire outer peripheral surface of the roll shape of the electrostatic unit 10, and is compressed by the cover 60 in the lamination direction and the plane direction. However, the disclosure is not limited thereto, and the first elastic body 41 may be compressed by the cover 60 only in the lamination direction of the electrostatic unit 10 and may not be compressed by the cover 60 in the plane direction of the electrostatic unit 10. In addition, the second elastic body 42 and the third elastic body 43 may not be compressed by the cover 60.

What is claimed is:

1. An electrostatic transducer, comprising:
an electrostatic unit, which comprises:
a first laminate sheet comprising a first electrode sheet formed in a band shape, and two first dielectric sheets formed in a band shape and having a width larger than a width of the first electrode sheet, wherein the two first dielectric sheets are laminated on two surfaces of the first electrode sheet with first ends in a width direction aligned with a first end in a width direction of the first electrode sheet; and
a second laminate sheet comprising a second electrode sheet formed in a band shape, and two second dielectric sheets formed in a band shape and having a width larger than a width of the second electrode sheet, wherein the two second dielectric sheets are laminated on two surfaces of the second electrode sheet with first ends in a width direction aligned with a first end in a width direction of the second electrode sheet,
wherein the electrostatic unit is in a state of being wound into a roll shape from the first laminate sheet and the second laminate sheet, and is flattened into a flat shape,
the first laminate sheet is in a state of being wound into a roll shape and is flattened into a flat shape,
the second laminate sheet is in a state of being laminated on the first laminate sheet and wound into a roll shape together with the first laminate sheet, and is flattened into a flat shape,
the first electrode sheet and the second electrode sheet are offset in the width direction,
the first electrode sheet is exposed on a first end surface in an axial direction of the roll shape, and
the second electrode sheet is exposed on a second end surface in the axial direction of the roll shape.

2. The electrostatic transducer according to claim 1, wherein at least one of a first end and a second end in a longitudinal direction of a band shape of at least one of the first laminate sheet and the second laminate sheet is curled with a curvature radius smaller than the roll shape.

3. The electrostatic transducer according to claim 2, wherein an end of at least one of the first laminate sheet and the second laminate sheet on an inner layer side of the roll shape of the electrostatic unit is curled with a curvature radius smaller than the roll shape.

4. The electrostatic transducer according to claim 3, wherein an end of the first laminate sheet on the inner layer side of the roll shape of the electrostatic unit is curled with a curvature radius smaller than the roll shape, and
an end of the second laminate sheet on the inner layer side of the roll shape of the electrostatic unit is curled with a curvature radius smaller than the roll shape.

5. The electrostatic transducer according to claim 1, wherein in the first laminate sheet, two ends in a longitudinal direction of the band shape of each of the two first dielectric sheets are positioned on an outer side in the longitudinal direction with respect to two ends in a longitudinal direction of the band shape of the first electrode sheet, and
the two ends in the longitudinal direction of the band shape of the first electrode sheet are enclosed by the two first dielectric sheets.

6. The electrostatic transducer according to claim 5, wherein the first electrode sheet is connected to a positive electrode potential, and
the second electrode sheet is connected to a ground potential.

7. The electrostatic transducer according to claim 5, wherein a length from the first end in the longitudinal direction of the band shape of each of the two first dielectric sheets to the first end in the longitudinal direction of the band shape of the first electrode sheet is set equal to or larger than a thickness of one of the two first dielectric sheets, and
a length from a second end in the longitudinal direction of the band shape of each of the two first dielectric sheets to a second end in the longitudinal direction of the band shape of the first electrode sheet is set equal to or larger than the thickness of one of the two first dielectric sheets.

8. The electrostatic transducer according to claim 6, wherein a length from the first end in the longitudinal direction of the band shape of each of the two first dielectric sheets to the first end in the longitudinal direction of the band shape of the first electrode sheet is set equal to or larger than a thickness of one of the two first dielectric sheets, and
a length from a second end in the longitudinal direction of the band shape of each of the two first dielectric sheets to a second end in the longitudinal direction of the band shape of the first electrode sheet is set equal to or larger than the thickness of one of the two first dielectric sheets.

9. The electrostatic transducer according to claim 1, wherein in the second laminate sheet, two ends in a longitudinal direction of the band shape of each of the two second dielectric sheets are positioned on an outer side in the longitudinal direction with respect to two ends in a longitudinal direction of the band shape of the second electrode sheet, and
the two ends in the longitudinal direction of the band shape of the second electrode sheet are enclosed by the two second dielectric sheets.

10. The electrostatic transducer according to claim 9, wherein a length from the first end in the longitudinal direction of the band shape of each of the two second dielectric sheets to the first end in the longitudinal direction of the band shape of the second electrode sheet is set equal to or larger than a thickness of one of the two second dielectric sheets, and
a length from a second end in the longitudinal direction of the band shape of each of the two second dielectric sheets to a second end in the longitudinal direction of the band shape of the second electrode sheet is set equal to or larger than the thickness of one of the two second dielectric sheets.

11. The electrostatic transducer according to claim 1, wherein at least one round of an innermost layer of the roll shape of the electrostatic unit is composed of only the first laminate sheet or only the second laminate sheet.

12. The electrostatic transducer according to claim 1, wherein the second electrode sheet is connected to the ground potential, and
at least one round of an outermost layer of the roll shape of the electrostatic unit is composed of only the second laminate sheet connected to the ground potential.

13. The electrostatic transducer according to claim 1, further comprising an elastic body that covers at least a flat surface of an outer peripheral surface of the roll shape of the electrostatic unit.

14. The electrostatic transducer according to claim 13, wherein the elastic body covers the entire outer peripheral surface of the roll shape of the electrostatic unit.

15. The electrostatic transducer according to claim 13, wherein an elastic modulus of the elastic body is smaller than an elastic modulus of the electrostatic unit.

16. The electrostatic transducer according to claim 14, wherein an elastic modulus of the elastic body is smaller than an elastic modulus of the electrostatic unit.

17. The electrostatic transducer according to claim 13, wherein a loss factor tan δ of the elastic body is equal to or smaller than a loss factor tan δ of the electrostatic unit under a predetermined condition.

18. The electrostatic transducer according to claim 14, wherein a loss factor tan δ of the elastic body is equal to or smaller than a loss factor tan δ of the electrostatic unit under a predetermined condition.

19. The electrostatic transducer according to claim 15, wherein a loss factor tan δ of the elastic body is equal to or smaller than a loss factor tan δ of the electrostatic unit under a predetermined condition.

20. The electrostatic transducer according to claim 16, wherein a loss factor tan δ of the elastic body is equal to or smaller than a loss factor tan δ of the electrostatic unit under a predetermined condition.

21. The electrostatic transducer according to claim 1, wherein the outermost layer of the roll shape of the electrostatic unit has an elastic modulus larger than inside of the roll shape of the electrostatic unit.

22. A manufacturing method of an electrostatic transducer, comprising:
   a first laminate sheet manufacturing process of manufacturing a first laminate sheet, which comprises a first electrode sheet formed in a band shape, and two first dielectric sheets formed in a band shape and having a width larger than a width of the first electrode sheet, wherein the two first dielectric sheets are laminated on two surfaces of the first electrode sheet with first ends in a width direction aligned with a first end in a width direction of the first electrode sheet;
   a second laminate sheet manufacturing process of manufacturing a second laminate sheet, which comprises a second electrode sheet formed in a band shape, and two second dielectric sheets formed in a band shape and having a width larger than a width of the second electrode sheet, wherein the two second dielectric sheets are laminated on two surfaces of the second electrode sheet with first ends in a width direction aligned with a first end in a width direction of the second electrode sheet;
   a composite laminate sheet manufacturing process of manufacturing a composite laminate sheet formed by laminating the first laminate sheet and the second laminate sheet; and
   a flattening rolling process of manufacturing a flat roll body by winding the composite laminate sheet into a roll shape and flattening the composite laminate sheet into a flat shape,
   wherein in the composite laminate sheet, the first electrode sheet and the second electrode sheet are offset in the width direction,
   in the composite laminate sheet, the first electrode sheet is exposed on a first end surface in an axial direction of the roll shape, and
   in the composite laminate sheet, the second electrode sheet is exposed on a second end surface in the axial direction of the roll shape.

23. The manufacturing method of the electrostatic transducer according to claim 22, further comprising a cutting process of cutting a first end and a second end in the axial direction of the roll shape of the flat roll body to expose the first electrode sheet and the second electrode sheet.

24. The manufacturing method of the electrostatic transducer according to claim 22, wherein in the composite laminate sheet manufacturing process, when the first laminate sheet and the second laminate sheet are laminated, at least one of a first end and a second end in a longitudinal direction of a band shape of at least one of the first laminate sheet and the second laminate sheet is curled with a curvature radius smaller than the roll shape.

25. The manufacturing method of the electrostatic transducer according to claim 22, wherein the first laminate sheet manufacturing process manufactures the first laminate sheet so that two ends in a longitudinal direction of the band shape of each of the two first dielectric sheets are positioned on an outer side in the longitudinal direction with respect to two ends in a longitudinal direction of the band shape of the first electrode sheet, and the two ends in the longitudinal direction of the band shape of the first electrode sheet are enclosed by the two first dielectric sheets.

* * * * *